(12) United States Patent
Ogawa et al.

(10) Patent No.: US 10,723,862 B2
(45) Date of Patent: Jul. 28, 2020

(54) POLYMERIZABLE COMPOSITION FOR OPTICAL MATERIAL AND OPTICAL MATERIAL AND PLASTIC LENS OBTAINED FROM SAME COMPOSITION

(71) Applicant: Mitsui Chemicals, Inc., Minato-ku, Tokyo (JP)

(72) Inventors: Tatsuya Ogawa, Omuta (JP); Andrea Vecchione, Rimini (IT); Roberto Forestieri, Ravenna (IT); Fiorenzo Renzi, Ravenna (IT); Willem Bos, Arnhem (NL)

(73) Assignee: MITSUI CHEMICALS, INC., Minato-ku, Tokyo (JP)

( * ) Notice: Subject to any disclaimer, the term of this patent is extended or adjusted under 35 U.S.C. 154(b) by 0 days.

(21) Appl. No.: 15/779,142

(22) PCT Filed: Nov. 25, 2016

(86) PCT No.: PCT/JP2016/084967
§ 371 (c)(1),
(2) Date: May 25, 2018

(87) PCT Pub. No.: WO2017/090725
PCT Pub. Date: Jan. 6, 2017

(65) Prior Publication Data
US 2018/0265674 A1    Sep. 20, 2018

(30) Foreign Application Priority Data

Nov. 27, 2015  (JP) ................. 2015-232019

(51) Int. Cl.
| | |
|---|---|
| *G02B 1/04* | (2006.01) |
| *C08K 5/13* | (2006.01) |
| *C08K 5/132* | (2006.01) |
| *C08F 2/44* | (2006.01) |
| *C08J 5/00* | (2006.01) |
| *C08K 5/00* | (2006.01) |
| *C08K 5/08* | (2006.01) |
| *C08K 5/23* | (2006.01) |
| *C08K 5/3475* | (2006.01) |

(52) U.S. Cl.
CPC ............. *C08K 5/132* (2013.01); *C08F 2/44* (2013.01); *C08J 5/00* (2013.01); *C08K 5/0091* (2013.01); *C08K 5/08* (2013.01); *C08K 5/23* (2013.01); *C08K 5/235* (2013.01); *C08K 5/3475* (2013.01); *G02B 1/04* (2013.01); *G02B 1/041* (2013.01)

(58) Field of Classification Search
CPC ........ C08F 216/125; C08F 2/44; G02B 1/041; G02B 1/04; C08K 5/132; C08K 5/3478; C08K 5/235; C08K 5/23; C08K 5/08; C08K 5/0091; C08K 5/14; C08K 5/06; C08K 5/0041; C08J 5/00

USPC ........................................... 428/412; 522/183
See application file for complete search history.

(56) References Cited

U.S. PATENT DOCUMENTS

| | | | | |
|---|---|---|---|---|
| 4,590,248 | A | * 5/1986 | Moriya | ............ C08F 18/24 526/228 |
| 5,221,721 | A | * 6/1993 | Selvig | ............ C08K 5/109 524/153 |
| 5,599,876 | A | 2/1997 | Renzi et al. | |
| 5,949,518 | A | * 9/1999 | Belmares | ............ C09D 5/32 351/159.57 |
| 5,973,093 | A | * 10/1999 | Daughenbaugh | ..... C08F 220/28 252/586 |

(Continued)

FOREIGN PATENT DOCUMENTS

| | | |
|---|---|---|
| CN | 103465418 A | 12/2013 |
| EP | 1 085 350 A1 | 3/2001 |

(Continued)

OTHER PUBLICATIONS

Office Action issued by the Japanese Patent Office in corresponding Japanese Patent Application No. 2017-552724 dated Aug. 21, 2018 (3 pages).

(Continued)

*Primary Examiner* — Sanza L. McClendon
(74) *Attorney, Agent, or Firm* — Buchanan Ingersoll & Rooney PC

(57) ABSTRACT

A polymerizable composition for an optical material of the present invention includes a compound (A) represented by General Formula (1) including two or more allyloxycarbonyl groups; an ultraviolet absorbing agent (B) represented by General Formula (i); at least one kind of radical polymerization initiator (C) selected from the group consisting of a peroxyketal-based radical polymerization initiator, a peroxymonocarbonate-based radical polymerization initiator, and a peroxyester-based radical polymerization initiator; at least one kind of dye (D) selected from an anthraquinone-based dye, a perinone-based dye, a monoazo-based dye, a diazo-based dye, and a phthalocyanine-based dye.

$$\left[ \begin{array}{c} R_1 \\ | \\ \diagup\!\!\!\diagdown\!\!\!\diagup\!\!\!\diagdown O\!\!-\!\!\overset{O}{\underset{\|}{C}}\!\!-\!\!X \end{array} \right]_n \tag{1}$$

$$(R_1O)_n\!\!-\!\!\!\diagup\!\!\!\diagdown\!\!\!\overset{O}{\underset{\|}{C}}\!\!\!\diagup\!\!\!\diagdown\!\!-\!\!(OR_1)_m \tag{i}$$

13 Claims, No Drawings

(56) References Cited

U.S. PATENT DOCUMENTS

| | | | |
|---|---|---|---|
| 6,310,162 B1 | 10/2001 | Bos et al. | |
| 6,316,517 B1* | 11/2001 | Dones | C09B 67/0021 |
| | | | 522/143 |
| 6,686,401 B1 | 2/2004 | Renzi et al. | |
| 6,773,465 B1 | 8/2004 | Murai et al. | |
| 7,214,754 B2* | 5/2007 | Nagpal | C08F 18/16 |
| | | | 348/902 |
| 7,261,845 B2 | 8/2007 | Itoh et al. | |
| 2003/0055203 A1* | 3/2003 | Ooga | G02B 1/041 |
| | | | 528/272 |
| 2003/0208019 A1* | 11/2003 | Ooga | G02B 1/041 |
| | | | 526/307.6 |
| 2005/0068492 A1 | 3/2005 | Itoh et al. | |
| 2007/0141355 A1 | 6/2007 | Kosaka et al. | |
| 2014/0078583 A1* | 3/2014 | DeMeio | G02B 5/3016 |
| | | | 359/487.02 |

FOREIGN PATENT DOCUMENTS

| | | |
|---|---|---|
| EP | 2 308 932 A1 | 4/2011 |
| JP | 60-245607 A | 12/1985 |
| JP | 7-2938 A | 1/1995 |
| JP | H08-157540 A | 6/1996 |
| JP | 10-186291 A | 7/1998 |
| JP | 2001-159747 A | 6/2001 |
| JP | 2001-518633 A | 10/2001 |
| JP | 2004-51851 A | 2/2004 |
| JP | 2005-107192 A | 4/2005 |
| JP | 2005-131799 A | 5/2005 |
| JP | 2005-266794 A | 9/2005 |
| WO | WO 00/31584 A2 | 6/2000 |
| WO | WO 01/16194 A | 3/2001 |
| WO | 01/88048 A1 | 11/2001 |

OTHER PUBLICATIONS

Extended European Search Reported issued by the European Patent Office in corresponding European Patent Application No. 16868668.1 dated Jun. 17, 2019 (5 pages).

International Search Report (PCT/ISA/210) dated Feb. 7, 2017, by the Japanese Patent Office as the International Searching Authority for International Application No. PCT/JP2016/084967.

Lilla Knels et al., "Blue light stress in retinal neuronal (R28) cells is dependent on wavelength range and irradiance", European Journal of Neuroscience, vol. 34, 2011, pp. 548-558.

Examination Report dated Dec. 12, 2019, by the Indian Patent Office in corresponding Indian Patent Application No. 201817019652. (6 pages).

* cited by examiner

POLYMERIZABLE COMPOSITION FOR OPTICAL MATERIAL AND OPTICAL MATERIAL AND PLASTIC LENS OBTAINED FROM SAME COMPOSITION

TECHNICAL FIELD

The present invention relates to a polymerizable composition for an optical material including an ultraviolet absorbing agent and to an optical material and a plastic lens obtained from the same composition.

BACKGROUND ART

In comparison with inorganic lenses, plastic lenses have a higher refractive index and a higher Abbe number, are lighter and harder to break, and can be dyed and have thus rapidly become widespread in optical materials such as spectacle lenses and camera lenses. Various molded articles for lenses have been developed and used up to now.

Among these, representative examples include allyl resins obtained from diethylene glycol bisallyl carbonate and diallyl isophthalate, (meth) acrylic resins obtained from (meth) acrylate, and polythiourethane resins obtained from isocyanate and thiols.

In recent years, advances have been made in the development of plastic lenses having a function of cutting ultraviolet (UV) light.

In the related art, adverse effects due to exposure of the eyes to ultraviolet light are regarded as a problem. Furthermore, in recent years, the blue light included in natural light or the light emitted from liquid crystal displays of office equipment, displays of portable equipment such as smartphones or mobile phones, and the like has had an influence on the eyes, causing problems such as feelings of eye fatigue and pain and there is a demand to reduce the amount of exposure of the eyes to light between ultraviolet light and blue light having a relatively short wavelength of approximately 420 nm.

Non-Patent Document 1 describes the influence of short wavelength blue light of approximately 420 nm on the eyes.

In Non-Patent Document 1, damage to retinal nerve cells (cultured retinal nerve R28 cells of rats) caused by irradiation with blue light emitting diode (LED) light having different peak wavelengths at 411 nm and 470 nm is verified. The results show that irradiation (4.5 W/m$^2$) with blue light having a peak wavelength at 411 nm causes the cell death of retinal nerve cells within 24 hours, whereas, for blue light having a peak wavelength at 470 nm, changes do not occur in cells even when irradiated with the same amount, and show that suppression of exposure of light having a wavelength of 400 to 420 nm is important for eye disorder prevention.

In addition, there is a concern that exposure of the eyes to blue light for a long time will result in eyestrain and stress and this is considered to be a factor causing age-related macular degeneration.

Patent Document 1 discloses a plastic lens including an ultraviolet absorbing agent having an average light transmittance of 0.5% or less in a wavelength range of equal to or more than 300 nm and equal to or less than 400 nm.

Patent Document 2 discloses a method in which a benzophenone-based ultraviolet absorbing agent is added to a diethylene glycol bisallyl carbonate polymer in an amount equal to or greater than that at which the light transmittance at a wavelength of 380 nm is 0% and equal to or less than that at which a light transmittance at a wavelength of 440 nm is 90%, so as to carry out radical polymerization to manufacture a diethylene glycol bisallyl carbonate polymer.

Patent Document 3 discloses a polymerizable composition including a polymerizable allyl carbonate, a photochromic compound and an ultraviolet absorbing agent in an amount not exceeding 1 part by weight with respect to 100 parts by weight of polymerizable allyl carbonate in a polymerizable composition. Furthermore, Patent Document 3 discloses that the polymerizable allyl carbonate may include bis(allyl carbonate) of a monomer of diethylene glycol or a mixture of a monomer and oligomer, bis(allyl carbonate) of a monomer of neopentyl glycol or a mixture of a monomer and oligomer, tetrakis(allyl carbonate) of pentaerythritol, or the like.

Patent Document 4 discloses that a polymerizable composition obtained by carrying out a transesterification reaction on a mixture of diallyl carbonate and a phthalic acid ester with one or more linear type or side chain type polyols including 2 to 8 carbon atoms may include an ultraviolet absorbing agent.

Patent Document 5 discloses that a polymerizable composition which includes predetermined amounts of an allyl ester compound, a bis(allyl carbonate) compound, an organic peroxide, and an organic dye, and describes that an ultraviolet absorbing agent may be further included. In the examples, Macrolex Blue RR and Solvaperm Red BB are used as organic dyes.

RELATED DOCUMENT

Patent Document

[Patent Document 1] Japanese Laid-open Patent Publication No. 10-186291
[Patent Document 2] Japanese Laid-open Patent Publication No. 60-245607
[Patent Document 3] Japanese Laid-open Patent Publication No. H7-2938
[Patent Document 4] International Publication No. 2001/16194
[Patent Document 5] International Publication No. 2000/31584

Non-Patent Document

[Non-patent Document 1] The European journal of neuroscience, vol. 34, Iss. 4, 548-58, (2011)

SUMMARY OF INVENTION

Technical Problem

As described above, the effects on eyes such as feelings of eye fatigue or pain caused by blue light included in natural light or in light emitted from the liquid crystal displays of office equipment and displays of mobile devices such as smart phones or mobile phones have become a problem in recent years and it is desired to reduce the amount of exposure of the eyes to light between ultraviolet light and blue light having a relatively short wavelength of approximately 420 nm.

Although it is possible to completely block ultraviolet light having a wavelength of 380 nm or less with a diethylene glycol bisallyl carbonate polymer described in Patent Document 2 obtained by radical polymerization by adding a benzophenone-based ultraviolet absorbing agent in an amount equal to or greater than that at which the light transmittance at a wavelength of 380 nm is 0% and equal to or less than that at which a light transmittance at a wavelength of 440 nm is 90% to the diethylene glycol bisallyl carbonate polymer, Patent Document 2 does not disclosed that it is possible to block blue light having a relatively short wavelength of approximately 420 nm.

Solution to Problem

As a result of studies to solve the problems of the related art, the present inventors found that, when a specific ultraviolet absorbing agent is used, the solubility of the ultraviolet absorbing agent in a compound including two or more allyloxycarbonyl groups is improved and, furthermore, that a polymer obtained from a polymerizable composition including a specific radical polymerization initiator and a dye has a superior effect of blocking light between harmful ultraviolet light and blue light of approximately 420 nm and also has an excellent external appearance.

That is, it is possible to illustrate the present invention as follows.

[1] A polymerizable composition for an optical material including a compound (A) represented by General Formula (1) and including two or more allyloxycarbonyl groups; an ultraviolet absorbing agent (B) represented by General Formula (i); at least one kind of radical polymerization initiator (C) selected from the group consisting of a peroxyketal-based radical polymerization initiator, a peroxymonocarbonate-based radical polymerization initiator, and a peroxyester-based radical polymerization initiator; at least one kind of dye (D) selected from an anthraquinone-based dye, a perinone-based dye, a monoazo-based dye, a diazo-based dye, and a phthalocyanine-based dye,

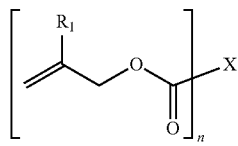

(1)

wherein, in the formula, n is an integer of 2 to 6, $R_1$ indicates a hydrogen atom or a methyl group, a plurality of present $R_1$'s may be the same or different, X is a divalent to hexavalent organic group a derived from a linear or branched aliphatic polyol having 3 to 12 carbon atoms which may have an oxygen atom, a divalent to hexavalent organic group b derived from an alicyclic polyol having 5 to 16 carbon atoms which may have an oxygen atom, or a divalent to hexavalent organic group c derived from an aromatic compound having 6 to 12 carbon atoms, and the organic group a or the organic group b forms an allyl carbonate group by bonding to an allyloxycarbonyl group via an oxygen atom derived from a hydroxyl group provided in these groups,

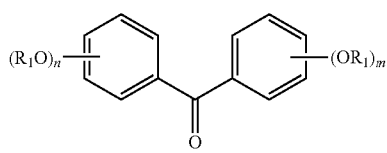

(i)

wherein, in the formula, $R_1$ indicates a hydrogen atom, a linear or branched alkyl group having 1 to 20 carbon atoms, a plurality of present $R_1$'s may be the same or different, m indicates an integer of 1 to 3, n indicates an integer of 1 to 3, and a sum of m and n is an integer of 3 to 6.

[2] The polymerizable composition for an optical material according to [1], in which the compound (A) including two or more allyloxycarbonyl groups includes an allyl carbonate polymerizable compound (A1) represented by General Formula (2) and an oligomer thereof, an allyl ester polymerizable compound (A2) represented by General Formula (3) or (4) and an oligomer thereof, or a polymerizable compound (A3) represented by General Formula (5) including at least one of an allyl ester group and an allyl carbonate group and an oligomer thereof,

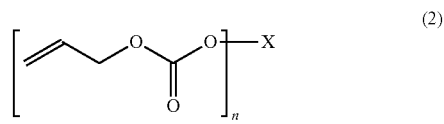

(2)

wherein, in Formula (2), X represents a divalent to hexavalent group derived from a linear or branched aliphatic polyol having 3 to 12 carbon atoms or a divalent to hexavalent group derived from an alicyclic polyol having 5 to 16 carbon atoms, and n represents an integer of 2 to 6,

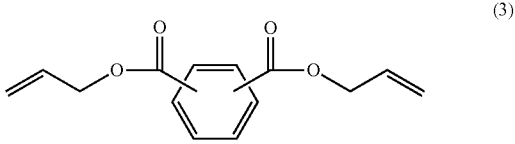

(3)

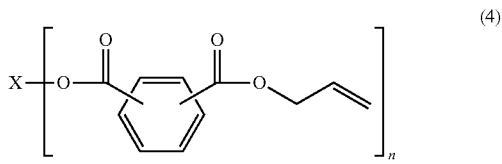

(4)

wherein, in Formula (4), X represents a divalent group derived from a linear or branched aliphatic diol having 2 to 8 carbon atoms, a trivalent to hexavalent group derived from a linear or branched aliphatic polyol having 3 to 10 carbon atoms and having 3 to 6 hydroxyl groups, and n represents an integer of 2 to 6,

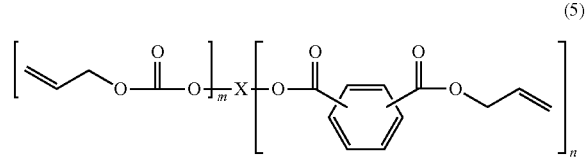

(5)

wherein, in Formula (5), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, m and n represent integers of 0 to 6, and a sum of m and n is an integer of 2 to 6.

[3] The polymerizable composition for an optical material according to [2], in which the allyl carbonate polymerizable compound (A1) includes at least one kind selected from a bis(allyl carbonate) compound of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$] tricyclodecane, a tris(allyl carbonate) compound of at least one kind of triol selected from glycerol, trimethylolpropane, and tris(hydroxyethyl) isocyanurate, a tetra(allyl carbonate) compound of at least one kind of tetraol selected from pentaerythritol, diglycerol, and ditrimethylol propane, a dipentaerythritol hexa(allyl carbonate) compound, and a mixed poly(allyl carbonate) compound of at least two kinds of compounds selected from the diols, the triols, the tetraols, and the dipentaerythritol.

[4] The polymerizable composition for an optical material according to [2], in which the allyl carbonate polymerizable compound (A1) includes at least one kind selected from (i) a mixture of a diethylene glycol bis(allyl carbonate) compound and an oligomer thereof, (ii) a mixture of a bis(allyl carbonate) compound of a mixture of diethylene glycol and neopentyl glycol and an oligomer thereof, (iii) a mixture of a poly(allyl carbonate) compound of a mixture of diethylene glycol and tris(hydroxyethyl) isocyanurate and an oligomer thereof, (iv) a mixture of a poly(allyl carbonate) compound of a mixture of diethylene glycol and trimethylolpropane and an oligomer thereof, (v) a mixture of a poly(allyl carbonate) compound of a mixture of diethylene glycol and pentaerythritol and an oligomer thereof, (vi) a mixture of a poly(allyl carbonate) compound of a mixture of diethylene glycol, neopentyl glycol and pentaerythritol and an oligomer thereof, and (vii) a poly(allyl carbonate) mixture including a mixture of a poly(allyl carbonate) compound of a mixture of diethylene glycol, neopentyl glycol, and pentaerythritol and an oligomer thereof, and a mixture of a diethylene glycol bis(allyl carbonate) compound and an oligomer thereof.

[5] The polymerizable composition for an optical material according to [2], in which the allyl ester polymerizable compound (A2) or the polymerizable compound (A3) includes at least one kind selected from a diallyl phthalate compound selected from diallyl isophthalate, diallyl terephthalate and diallyl orthophthalate, a diallyl ester compound obtained by transesterification reaction of the diallyl phthalate compound and a mixture of at least one kind of diol selected from ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, and 1,4-dimethylolcyclohexane, and an oligomer thereof, a polyallyl ester compound obtained by transesterification reaction of the diallyl phthalate compound and a mixture of at least one kind of polyol selected from glycerol, trimethylolpropane, tris(hydroxyethyl) isocyanurate, pentaerythritol, diglycerol, ditrimethylolpropane, and dipentaerythritol, and an oligomer thereof, and an allyl ester compound, an allyl carbonate compound, and a compound having an allyl carbonate group and an allyl ester group, obtained by transesterification reaction of a mixture of at least one kind of dialkyl phthalate selected from dialkyl isophthalate having an alkyl group having 1 to 3 carbon atoms, dialkyl terephthalate, and dialkyl orthophthalate, allyl alcohol, diallyl carbonate, and the diols or the polyols, and oligomers thereof.

[6] The polymerizable composition for an optical material according to [2], in which the allyl ester polymerizable compound (A2) or the polymerizable compound (A3) includes at least one kind selected from (i) a mixture of diallyl terephthalate and a diethylene glycol bis(allyl carbonate) compound at 30% by weight with respect to the diallyl terephthalate and an oligomer thereof, (ii) an allyl ester compound obtained by transesterification reaction of a mixture of diallyl terephthalate and propylene glycol, (iii) a mixture of the allyl ester compound of (ii) and a diethylene glycol bis(allyl carbonate) compound at 20% by weight with respect to the allyl ester compound and an oligomer thereof, (iv) a mixture of an allyl ester compound, an allyl carbonate compound, and a compound having an allyl ester group and an allyl carbonate group, obtained by transesterification reaction of a mixture of dimethyl terephthalate, allyl alcohol, diallyl carbonate, and diethylene glycol, and (v) a mixture of the mixture obtained in (iv) and a diethylene glycol bis(allyl carbonate) compound at 10% by weight with respect to the mixture and an oligomer thereof.

[7] The polymerizable composition for an optical material according to [2], in which the compound (A) including two or more allyloxycarbonyl groups is a mixture of the allyl ester polymerizable compound (A2) and/or the polymerizable compound (A3) according to [5] and oligomers thereof, and the allyl carbonate polymerizable compound (A1) according to [3] and an oligomer thereof.

[8] The polymerizable composition for an optical material according to [1] to [7], in which the ultraviolet absorbing agent (B) is 2,2'-dihydroxy-4-methoxybenzophenone, 2,2',4,4'-tetrahydroxybenzophenone, or 2,2'-dihydroxy-4,4'-dimethoxybenzophenone.

[9] The polymerizable composition for an optical material according to any one of [1] to [8], in which the radical polymerization initiator (C) is at least one kind selected from the group consisting of a peroxyketal-based polymerization initiator represented by General Formula (6) having a 10-hour half-life temperature of 80° C. or higher, a peroxymonocarbonate-based polymerization initiator represented by General Formula (7) having a 10-hour half-life temperature of 80° C. or higher, and a peroxyester-based polymerization initiator represented by General Formula (8) having a 10-hour half-life temperature of 65° C. or higher,

(6)

wherein, in Formula (6), $R_3$ is a tertiary alkyl group, $R_1$ and $R_2$ are each independently an alkyl group selected from methyl, ethyl, propyl, and butyl, and the alkyl group may have an alkyl ester group at a terminal of a chain or $R_1$ and $R_2$ may form a cycloalkylene group together with carbon atoms bonded thereto together, and the cycloalkylene group may have 1 to 3 alkyl substituents,

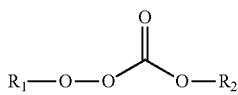

(7)

wherein, in Formula (7), $R_1$ is a tertiary alkyl group having 3 to 6 carbon atoms, and $R_2$ is a linear or branched alkyl group having 3 to 8 carbon atoms,

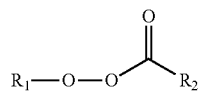

(8)

wherein, in Formula (8), $R_1$ is a tertiary alkyl group having 3 to 6 carbon atoms, and $R_2$ is a linear or branched alkyl group having 3 to 9 carbon atoms or a phenyl group.

[10] A molded article obtained by curing the polymerizable composition for an optical material according to any one of [1] to [9].

[11] An optical material including the molded article according to [10].

[12] A plastic lens including the molded article according to [10].

[13] A method for manufacturing a plastic lens including a step of preparing a polymerizable composition for an optical material by batch mixing a compound (A) represented by General Formula (1) including two or more allyloxycarbonyl groups, an ultraviolet absorbing agent (B) represented by General Formula (i), at least one kind of radical polymerization initiator (C) selected from the group consisting of a peroxyketal-based radical polymerization initiator, a peroxymonocarbonate-based radical polymerization initiator, and a peroxyester-based radical polymerization initiator, at least one kind of dye (D) selected from an anthraquinone-based dye, a perinone-based dye, a monoazo-based dye, a diazo-based dye, and a phthalocyanine-based dye, and a step of forming a lens base material by casting and polymerizing the polymerizable composition for an optical material,

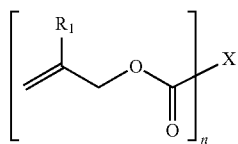

(1)

wherein, in the formula, n is an integer of 2 to 6, $R_1$ indicates a hydrogen atom or a methyl group, a plurality of present $R_1$'s may be the same or different, X is a divalent to hexavalent organic group a derived from a linear or branched aliphatic polyol having 3 to 12 carbon atoms which may have an oxygen atom, a divalent to hexavalent organic group b derived from an alicyclic polyol having 5 to 16 carbon atoms which may have an oxygen atom, or a divalent to hexavalent organic group c derived from an aromatic compound having 6 to 12 carbon atoms, and the organic group a or the organic group b forms an allyl carbonate group by bonding to an allyloxycarbonyl group via an oxygen atom derived from a hydroxyl group provided in these groups,

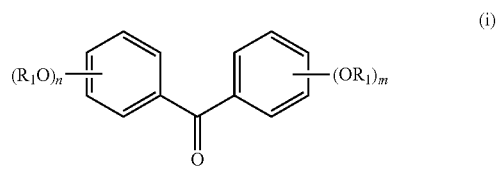

(i)

wherein, in the formula, $R_1$ indicates a hydrogen atom, or a linear or branched alkyl group having 1 to 20 carbon atoms, a plurality of present $R_1$'s may be the same or different, m indicates an integer of 1 to 3, n indicates an integer of 1 to 3, and a sum of m and n is an integer of 3 to 6.

In the present invention, for example, "a diol bis(allyl carbonate) compound" means a compound having a structure in which two hydroxyl groups of a diol are replaced with allyl carbonate groups.

In the present invention, for example, "a bis(allyl carbonate) compound of a mixture of diethylene glycol and neopentyl glycol" means <1> a compound having a structure in which two hydroxyl groups of diethylene glycol are replaced with allyl carbonate groups, and <2> a compound having a structure in which two hydroxyl groups of neopentyl glycol are replaced with allyl carbonate groups.

In the present invention, for example, "an oligomer of a bis(allyl carbonate) compound of a mixture of diethylene glycol and neopentyl glycol" means an oligomer of the compound <1> (a compound having a structure in which two hydroxyl groups of a compound in which diethylene glycol is linearly oligomerized via a carbonate bond are replaced with allyl carbonate groups), an oligomer of the compound <2> (a compound having a structure in which two hydroxyl groups of a compound in which neopentyl glycol is linearly oligomerized via a carbonate bond are replaced with allyl carbonate groups), and an oligomer of the compound <1> and the compound <2> (a compound having a structure in which two hydroxyl groups of a compound in which diethylene glycol and neopentyl glycol are linearly oligomerized in an arbitrary sequence in the same molecule via a carbonate bond are replaced with allyl carbonate groups).

Advantageous Effects of Invention

According to the present invention, it is possible to provide an optical material which has a superior effect of blocking light between harmful ultraviolet light and blue light of approximately 420 nm and which has colorless, transparent and external appearance. Since the optical material of the present invention is excellent in optical properties such as refractive index and Abbe number, has colorless, transparent and external appearance, and is also able to reduce the influence of harmful light on the eyes and suppress problems such as eye fatigue and stress it is possible for the optical material of the present invention to be particularly suitably used as a plastic spectacle lens.

DESCRIPTION OF EMBODIMENTS

A description of the polymerizable composition for an optical material of the present invention based on the following embodiments will be given.

The polymerizable composition for an optical material of the present embodiment includes a compound (A) represented by General Formula (1) including two or more allyloxycarbonyl groups; an ultraviolet absorbing agent (B) represented by General Formula (i); at least one kind of radical polymerization initiator (C) selected from the group consisting of a peroxyketal-based radical polymerization initiator, a peroxymonocarbonate-based radical polymerization initiator, and a peroxyester-based radical polymerization initiator; and at least one kind of dye (D) selected from an anthraquinone-based dye, a perinone-based dye, a monoazo-based dye, a diazo-based dye, and a phthalocyanine-based dye.

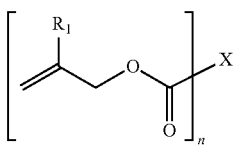
(1)

In the formula, n is an integer of 2 to 6. $R_1$ indicates a hydrogen atom or a methyl group, and a plurality of present $R_1$'s may be the same or different.

X is a divalent to hexavalent organic group a derived from a linear or branched aliphatic polyol having 3 to 12 carbon atoms which may have an oxygen atom, a divalent to hexavalent organic group b derived from an alicyclic polyol having 5 to 16 carbon atoms which may have an oxygen atom, or a divalent to hexavalent organic group c derived from an aromatic compound having 6 to 12 carbon atoms, and the organic group a or the organic group b forms an allyl carbonate group by bonding to an allyloxycarbonyl group via an oxygen atom derived from a hydroxyl group provided in these groups.

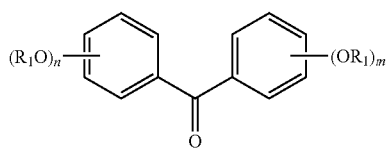
(i)

In the formula, $R_1$ indicates a hydrogen atom, or a linear or branched alkyl group having 1 to 20 carbon atoms. A plurality of present $R_1$'s may be the same or different. m indicates an integer of 1 to 3, n indicates an integer of 1 to 3, and the sum of m and n is an integer of 3 to 6.

Using a combination of the components (A) to (D) in the polymerizable composition for an optical material of the present embodiment makes it possible to sufficiently exhibit an ultraviolet cutting function while maintaining a good hue and transparency.

Each component will be described below.

[Compound (A) Including Two or More Allyloxycarbonyl Groups]

It is possible to represent the compound (A) including two or more allyloxycarbonyl groups in the present embodiment by the following formula.

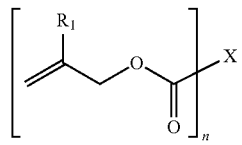
(1)

In the formula, n is an integer of 2 to 6. $R_1$ indicates a hydrogen atom or a methyl group, and a plurality of present $R_1$'s may be the same or different.

X is a divalent to hexavalent organic group a derived from a linear or branched aliphatic polyol a1 having 3 to 12 carbon atoms which may have an oxygen atom, a divalent to hexavalent organic group b derived from an alicyclic polyol b1 having 5 to 16 carbon atoms which may have an oxygen atom, or a divalent to hexavalent organic group c derived from an aromatic compound c1 having 6 to 12 carbon atoms, and the organic group a or the organic group b forms an allyl carbonate group by bonding to an allyloxycarbonyl group via an oxygen atom derived from a hydroxyl group.

These polyols normally include 2 to 6 hydroxyl groups in the molecule, and it is possible for these polyols to include 2 to 4 hydroxyl groups in the molecule, which is preferable.

Examples of the aliphatic polyol a1 include diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, glycerol, trimethylolpropane, tris(hydroxyethyl) isocyanurate, pentaerythritol, dipentaerythritol, and the like.

Examples of the alicyclic polyol b1 include 1,4-dimethylolcyclohexane, 4,8-bis(hydroxymethyl)-[$5.2.1.0^{2,6}$] tricyclodecane, and the like.

Examples of the aromatic compound c1 include benzene, toluene, xylene, naphthalene, and the like.

Specific examples of the compound (A) including two or more allyloxycarbonyl groups include an allyl carbonate polymerizable compound (A1), an allyl ester polymerizable compound (A2), and a polymerizable compound (A3) including at least one of an allyl carbonate group and an allyl ester group.

It is possible for the compound (A) including two or more allyloxycarbonyl groups to include an oligomer thereof. A compound including two or more allyloxycarbonyl groups is a liquid product at room temperature, the viscosity measured at 25° C. is 10 to 1000 cSt, and it is possible to change the oligomer content in a wide range, for example, 0 to approximately 80% by weight.

(Allyl Carbonate Polymerizable Compound (A1))

The allyl carbonate polymerizable compound (A1) can be represented by Formula (2) and may include an oligomer thereof. The oligomer is a poly(allyl carbonate) in which two or more molecules of a polyol are linked via a carbonate group produced by transesterification reaction of allyl carbonate produced in the production step and a polyol.

The allyl carbonate polymerizable compound is a poly (allyl carbonate) compound of a linear or branched aliphatic polyol having 3 to 12 carbon atoms. A poly(allyl carbonate) compound of an alicyclic polyol having 5 to 16 carbon atoms in the molecule is also suitable for this purpose. These polyols usually have 2 to 6 hydroxyl groups in the molecule and it is possible for these polyols to have 2 to 4 hydroxyl groups in the molecule, which is preferable. It is also possible to use a mixed poly(allyl carbonate) compound, that is, a compound which is derived from at least two kinds of polyols and which can be obtained by mechanical mixing of the respective polyol poly(allyl carbonate) compounds, or a compound obtained directly by a chemical reaction starting from a mixture of polyols and diallyl carbonate.

Finally, it is possible for all these poly(allyl carbonate) compounds to be in the form of monomers or mixtures of monomers and oligomers. Generally, the allyl carbonate polymerizable compound is a liquid product at room temperature, the viscosity measured at 25° C. is 10 to 1000 cSt, and it is possible to change the oligomer content in a wide range, for example, 0 to approximately 80% by weight.

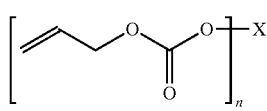
(2)

In Formula (2), X represents a divalent to hexavalent group derived from a linear or branched aliphatic polyol having 3 to 12 carbon atoms or a divalent to hexavalent group derived from an alicyclic polyol having 5 to 16 carbon atoms, and n represents an integer of 2 to 6.

Specific examples of the polyols forming X in General Formula (2) include diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, 4,8-bis(hydroxymethyl)-[5.2.1.0$^{2,6}$] tricyclodecane, glycerol, trimethylolpropane, tris(hydroxyethyl) isocyanurate, pentaerythritol, diglycerol, ditrimethylolpropane, dipentaerythritol, and the like.

Accordingly, examples of the allyl carbonate compounds include at least one kind selected from bis(allyl carbonate) compounds of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$] tricyclodecane; tris(allyl carbonate) compounds of at least one kind of triol selected from glycerol, trimethylolpropane, and tris(hydroxyethyl) isocyanurate; tetra(allyl carbonate) compounds of at least one kind of tetraol selected from pentaerythritol, diglycerol, and ditrimethylol propane; dipentaerythritolhexa(allyl carbonate) compounds; and a mixed poly(allyl carbonate) compound of at least two kinds of compounds selected from the diols, the triols, the tetraols, and the dipentaerythritol.

The "bis(allyl carbonate) of a mixture of at least two kinds of diols" is, for example, obtained as a mixture of the following monomer components and oligomer components in a case where the diols are diethylene glycol and neopentyl glycol.

Monomer Component
(1) Diethylene glycol bis(allyl carbonate)
(2) Neopentyl glycol bis(allyl carbonate)
Oligomer Component
(3) Oligomer including only hydrocarbons (and ethers) derived from diethylene glycol (a compound having a structure in which two hydroxyl groups of a compound in which diethylene glycol is linearly oligomerized via a carbonate bond are replaced with allyl carbonate groups)
(4) Oligomer including only hydrocarbons derived from neopentyl glycol (a compound having a structure in which two hydroxyl groups of a compound in which neopentyl glycol is linearly oligomerized via a carbonate bond are replaced with allyl carbonate groups)
(5) Complex oligomer including both hydrocarbons (and ethers) derived from diethylene glycol and a hydrocarbon derived from neopentylglycol in the same molecule (a compound having a structure in which two hydroxyl groups of a compound in which diethylene glycol and neopentyl glycol are linearly oligomerized in an arbitrary sequence in the same molecule via a carbonate bond are replaced with allyl carbonate groups)

The following are preferable examples of the allyl carbonate polymerizable compound (A1) suitable for the purposes of the present invention.
(i) Mixture with diethylene glycol bis(allyl carbonate) and oligomers thereof Diethylene glycol bis(allyl carbonate) can be defined by Formula (I).

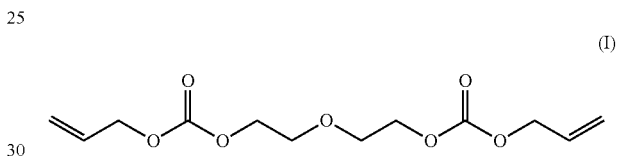
(I)

In addition, it is possible to define an oligomer of diethylene glycol bis(allyl carbonate) by Formula (II).

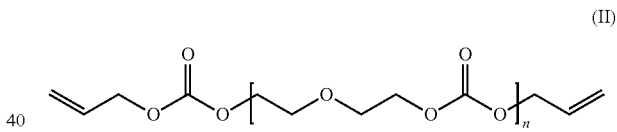
(II)

In the formula, n is equal to or more than 2 and equal to or less than 10.

It is possible to manufacture compound (I) by reacting diethylene glycol bis(chloroformate) with allyl alcohol as described in, for example, "Encyclopedia of Chemical Technology", Kirk-Othmer, Third Edition, Volume 2, pages 111-112. It is possible to easily produce mixtures of diethylene glycol-bis(allyl carbonate) (Formula (I)) and an oligomer (Formula (II)) thereof by ester replacement between diallyl carbonate and diethylene glycol in the presence of a basic catalyst, for example, as described in EP 35,304. These mixtures usually include up to approximately 80% by weight of oligomers.

(ii) Mixture of bis(allyl carbonate) compound of a mixture of diethylene glycol and neopentyl glycol with oligomers thereof This bis(allyl carbonate) compound is the same as the bis(allyl carbonate) compound of point (i) above except that diethylene glycol is replaced with a mixture of diethylene glycol and neopentyl glycol.

(iii) Mixture of poly(allyl carbonate) compound of a mixture of diethylene glycol and tris(hydroxyethyl) isocyanurate with oligomers thereof It is possible to obtain the poly(allyl carbonate) compound by ester replacement of a diallyl carbonate of a mixture of diethylene glycol and tris(hydroxyethyl) isocyanurate, for example, as described in U.S. Pat. No. 4,812,545.

(iv) Mixture of poly(allyl carbonate) compound of a mixture of diethylene glycol and trimethylolpropane with oligomers thereof This poly(allyl carbonate) compound is the same as the poly(allyl carbonate) compound of point (iii) above, except that tris(hydroxyethyl) isocyanurate is replaced with trimethylol propane.

(v) Mixture of poly(allyl carbonate) compound of a mixture of diethylene glycol and pentaerythritol with oligomers thereof This poly(allyl carbonate) compound is the same as the poly(allyl carbonate) compound of point (iii) above, except that tris(hydroxyethyl) isocyanurate is replaced with pentaerythritol.

(vi) Mixture of poly(allyl carbonate) compound of a mixture of diethylene glycol, neopentyl glycol, and pentaerythritol with oligomers thereof This poly(allyl carbonate) compound is the same as the poly(allyl carbonate) compound of point (v) above, except that diethylene glycol is replaced with two kinds of diols of diethylene glycol and neopentyl glycol.

(vii) Poly(allyl carbonate) mixture including a mixture of poly(allyl carbonate) compound of a mixture of diethylene glycol, neopentyl glycol, and pentaerythritol with oligomers thereof and a mixture of diethylene glycol bis(allyl carbonate) compound with oligomers thereof (Allyl Ester Polymerizable Compound (A2), Polymerizable Compound (A3))

Examples of the allyl ester polymerizable compound (A2) include diallyl phthalate represented by General Formula (3) and oligomers thereof, and allyl ester compounds represented by General Formula (4) and oligomers thereof obtained by transesterification reaction of a mixture of diallyl phthalate and a polyol. Examples of the polymerizable compound (A3) include a polymerizable compound represented by General Formula (5) including at least one of an allyl ester group and an allyl carbonate group and oligomers thereof.

The polymerizable compound represented by General Formula (5) includes a mixture of an allyl ester compound, an allyl carbonate compound, and compounds having an allyl ester group and an allyl carbonate group, obtained by transesterification reaction of a mixture of dialkyl phthalate, allyl alcohol, diallyl carbonate, and a polyol.

In the present embodiment, the compounds of general Formulas (3) to (5) include regioisomers.

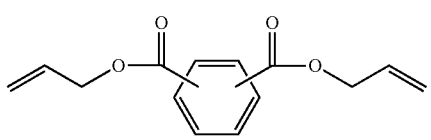

(3)

The diallyl phthalate represented by General Formula (3) is at least one kind selected from diallyl isophthalate, diallyl terephthalate, and diallyl orthophthalate.

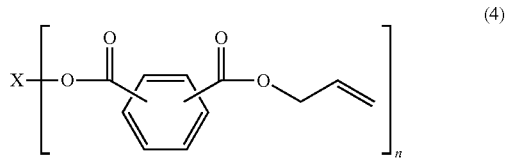

(4)

In Formula (4), x represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, and n is an integer of 2 to 6.

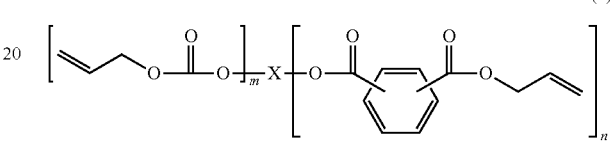

(5)

In Formula (5), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, m and n represent integers of 0 to 6, and the sum of m and n is an integer of 2 to 6.

Specific examples of the diallyl phthalate to be used are diallyl isophthalate, diallyl terephthalate, diallyl orthophthalate, the dialkyl phthalate is a phthalic acid diester having an alkyl group having 1 to 3 carbon atoms, and specific examples thereof include dimethyl isophthalate, dimethyl terephthalate, dimethyl orthophthalate, diethyl isophthalate, diethyl terephthalate, diethyl orthophthalate, dipropyl isophthalate, dipropyl terephthalate, and dipropyl orthophthalate.

Specific examples of the polyol (aliphatic diol, aliphatic polyol) forming X in Formula (4) and Formula (5) include diols of ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, and 1,4-dimethylolcyclohexane; triols of glycerol and trimethylolpropane; and polyols of tris(hydroxyethyl) isocyanurate, pentaerythritol, diglycerol, ditrimethylol propane, and dipentaerythritol.

It is possible for the compounds of Formula (4) and Formula (5) to include oligomers thereof. The oligomer in Formula (4) is produced by transesterification reaction of an allyl ester compound produced in a production step and a polyol. The oligomer in Formula (5) is produced by transesterification reaction of the allyl ester compound or the allyl carbonate compound produced in the production step and the polyol.

Accordingly, the allyl ester polymerizable compound (A2) or the polymerizable compound (A3) includes at least one kind selected from, for example, a diallyl phthalate compound selected from diallyl isophthalate, diallyl terephthalate, and diallyl orthophthalate; diallyl ester compounds and oligomers thereof obtained by transesterification reaction between the diallyl phthalate compound and a mixture of at least one kind of diol selected from ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and the like; a polyallyl ester compound and an oligomer thereof fication reaction of a mixture of dimethyl terephthalate, allyl alcohol, diallyl carbonate, and diethylene glycol.

It is possible for the allyl ester polymerizable compound (A2) or the polymerizable compound (A3) described above to be defined by the Formulas (III) to (V), the diallyl terephthalate of Formula (III) is the main component thereof, and each includes an oligomer obtained by transesterification reaction with a polyol.

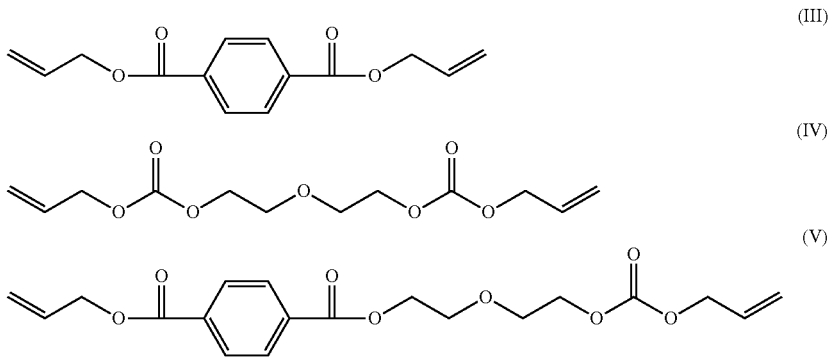

obtained by transesterification reaction between the diallyl phthalate and a mixture of at least one kind of polyol selected from triols of glycerol and trimethylolpropane, tris(hydroxyethyl) isocyanurate, pentaerythritol, diglycerol, ditrimethylol propane, dipentaerythritol, and the like; and an allyl ester compound, an allyl carbonate compound, a compound having an allyl carbonate group and an allyl ester group, and oligomers thereof, obtained by transesterification reaction of a mixture of at least one kind of dialkyl phthalate having 1 to 3 carbon atoms selected from dimethyl isophthalate, dimethyl terephthalate, dimethyl orthophthalate, diethyl isophthalate, diethyl terephthalate, diethyl orthophthalate, dipropyl isophthalate, dipropyl terephthalate, and dipropyl orthophthalate, an allyl alcohol, diallyl carbonate, and the diol or polyol described above.

More specifically, the allyl ester polymerizable compound (A2) or the polymerizable compound (A3) preferably includes at least one kind selected from (i) a mixture of diallyl terephthalate and a diethylene glycol bis(allyl carbonate) compound at 30% by weight with respect to the diallyl terephthalate and an oligomer thereof, (ii) an allyl ester compound obtained by transesterification reaction of a mixture of diallyl terephthalate and propylene glycol, (iii) a mixture of the allyl ester compound of (ii) and a diethylene glycol bis(allyl carbonate) compound at 20% by weight with respect to the allyl ester compound and an oligomer thereof, (iv) a mixture of an allyl ester compound, an allyl carbonate compound, and a compound having an allyl ester group and an allyl carbonate group, obtained by transesterification reaction of a mixture of dimethyl terephthalate, allyl alcohol, diallyl carbonate, and diethylene glycol, and (v) a mixture of the mixture obtained in (iv) and a diethylene glycol bis(allyl carbonate) compound at 10% by weight with respect to the mixture and an oligomer thereof.

The following are preferable examples of the allyl ester polymerizable compound (A2) or the polymerizable compound (A3) suitable for the purposes of the present invention. (i) a mixture of an allyl ester compound, an allyl carbonate compound, and a compound having an allyl ester group and an allyl carbonate group, obtained by transesteri- In the present embodiment, from the viewpoint of the effect of the present invention, it is possible to set the compound (A) including two or more allyloxycarbonyl groups as a mixture of the allyl ester polymerizable compound (A2) and/or the polymerizable compound (A3) and oligomers thereof with the allyl carbonate polymerizable compound (A1) and an oligomer thereof.

[(B) Ultraviolet Absorbing Agent]

In the present embodiment, it is possible to use a compound represented by General Formula (i) as the ultraviolet absorbing agent (B).

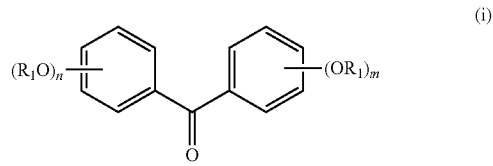

In the formula, $R_1$ indicates a hydrogen atom, or a linear or branched alkyl group having 1 to 20 carbon atoms. A plurality of present $R_1$'s may be the same or different.

$R_1$ is preferably a linear or branched alkyl group having 1 to 20 carbon atoms such as a hydrogen atom, a methyl group, an ethyl group, a propyl group, an isopropyl group, a butyl group, an isobutyl group, a sec-butyl group, a tert-butyl group, a pentyl group, a hexyl group, a heptyl group, an octyl group, a 2-ethyl hexyl group, a nonyl group, and a decyl group, and particularly preferably a hydrogen atom, a methyl group, an ethyl group, and a propyl group.

m is an integer of 1 to 5, preferably an integer of 1 to 3, n is an integer of 1 to 5, preferably an integer of 1 to 3, and the sum of m and n is an integer of 2 to 10, preferably an integer of 3 to 6.

Examples of such an ultraviolet absorbing agent (B) include
2,2',4-trihydroxybenzophenone,
2,2'-dihydroxy-4-methoxybenzophenone,
2,2'-dihydroxy-4-ethoxybenzophenone, 2,2'-dihydroxy-4-n-propoxybenzophenone,
2,2'-dihydroxy-4-isopropoxybenzophenone,
2,2'-dihydroxy-4-n-butoxybenzophenone,
2,2'-dihydroxy-4-t-butoxybenzophenone,
2-hydroxy-4,4'-dimethoxybenzophenone,
2-hydroxy-4,4'-diethoxybenzophenone,
2-hydroxy-4,4'-di-n-propoxybenzophenone,
2-hydroxy-4,4'-diisopropoxybenzophenone,
2-hydroxy-4,4'-di-n-butoxybenzophenone,
2-hydroxy-4,4'-di-t-butoxybenzophenone,
2-hydroxy-4-methoxy-4'-ethoxybenzophenone,
2-hydroxy-4-methoxy-4'-n-propoxybenzophenone,
2-hydroxy-4-methoxy-4'-isopropoxybenzophenone,
2-hydroxy-4-methoxy-4'-n-butoxybenzophenone,
2-hydroxy-4-methoxy-4'-t-butoxybenzophenone,
2-hydroxy-4-ethoxy-4'-methoxybenzophenone,
2-hydroxy-4-ethoxy-n-propoxybenzophenone,
2-hydroxy-4-ethoxy-4'-isopropoxybenzophenone,
2-hydroxy-4-ethoxy-4'-n-butoxybenzophenone,
2-hydroxy-4-ethoxy-4'-t-butoxybenzophenone,
2-hydroxy-4-n-propoxy-4'-methoxybenzophenone,
2-hydroxy-4-n-propoxy-4'-ethoxybenzophenone,
2-hydroxy-4-n-propoxy-4'-isopropoxybenzophenone,
2-hydroxy-4-n-propoxy-4'-n-butoxybenzophenone,
2-hydroxy-4-n-propoxy-4'-t-butoxybenzophenone,
2-hydroxy-4-isopropoxy-4'-methoxybenzophenone,
2-hydroxy-4-isopropoxy-4'-ethoxybenzophenone,
2-hydroxy-4-isopropoxy-4'-n-propoxybenzophenone,
2-hydroxy-4-isopropoxy-4'-n-butoxybenzophenone,
2-hydroxy-isopropoxy-4'-t-butoxybenzophenone,
2-hydroxy-4-n-butoxy-4'-methoxybenzophenone,
2-hydroxy-4-n-butoxy-4'-ethoxybenzophenone,
2-hydroxy-4-n-butoxy-4'-n-propoxybenzophenone,
2-hydroxy-4-n-butoxy-4'-isopropoxybenzophenone,
2-hydroxy-4-n-butoxy-4'-t-butoxybenzophenone,
2-hydroxy-4-t-butoxy-4'-methoxybenzophenone,
2-hydroxy-4-t-butoxy-4'-ethoxybenzophenone,
2-hydroxy-4-t-butoxy-4'-n-propoxybenzophenone,
2-hydroxy-4-t-butoxy-4'-isopropoxybenzophenone,
2-hydroxy-4-t-butoxy-4'-n-butoxybenzophenone,
2,2',4,4'-tetrahydroxybenzophenone,
2,2'-dihydroxy-4,4'-dimethoxybenzophenone,
2,2'-dihydroxy-4,4'-diethoxybenzophenone,
2,2'-dihydroxy-4,4'-di-n-propoxybenzophenone,
2,2'-dihydroxy-4,4'-di-isopropoxybenzophenone,
2,2'-dihydroxy-4,4'-di-n-butoxybenzophenone,
2,2'-dihydroxy-4,4'-di-t-butoxybenzophenone,
2,2'-dihydroxy-4-methoxy-4'-diethoxybenzophenone,
2,2'-dihydroxy-4-methoxy-4'-n-propoxybenzophenone,
2,2'-dihydroxy-4-methoxy-4'-isopropoxybenzophenone,
2,2'-dihydroxy-4-methoxy-4'-n-butoxybenzophenone,
2,2'-dihydroxy-4-methoxy-4'-t-butoxybenzophenone,
2,2'-dihydroxy-4-ethoxy-4'-n-propoxybenzophenone,
2,2'-dihydroxy-4-ethoxy-4'-isopropoxybenzophenone,
2,2'-dihydroxy-4-ethoxy-4'-n-butoxybenzophenone,
2,2'-dihydroxy-4-ethoxy-4'-t-butoxybenzophenone,
2,2'-dihydroxy-4-n-propoxy-4'-isopropoxybenzophenone,
2,2'-dihydroxy-4-n-propoxy-4'-n-butoxybenzophenone,
2,2'-dihydroxy-4-n-propoxy-4'-t-butoxybenzophenone,
2,2'-dihydroxy-4-isopropoxy-4'-n-butoxybenzophenone,
2,2'-dihydroxy-4-isopropoxy-4'-t-butoxybenzophenone,
2,2'-dihydroxy-4-n-butoxy-4'-t-butoxybenzophenone,
2,2',4-trimethoxybenzophenone, 2,2',4-triethoxybenzophenone,
2,2',4-tri-n-propoxybenzophenone,
2,2',4-triisopropoxybenzophenone, 2,2',5-trimethoxybenzophenone,
2,2',5-triethoxybenzophenone, 2,2',5-tri-n-propoxybenzophenone,
2,2',5-triisopropoxybenzophenone, 2,4,4'-trimethoxybenzophenone,
2,4,4'-triethoxybenzophenone, 2,4,4'-tri-n-propoxybenzophenone,
2,4,4'-triisopropoxybenzophenone, 3,4',5-trimethoxybenzophenone,
3,4',5-triethoxybenzophenone, 3,4',5-tri-n-propoxybenzophenone,
3,4',5-triisopropoxybenzophenone,
2,4-dimethoxy-4'-hydroxybenzophenone,
2,4-diethoxy-4'-hydroxybenzophenone,
2,4-di-n-propoxy-4'-hydroxybenzophenone,
2,4-diisopropoxy-4'-hydroxybenzophenone,
2,2',4,4'-tetramethoxybenzophenone,
2,2',4,4'-tetraethoxybenzophenone,
3,3'4,4'-tetramethoxybenzophenone,
3,3',4,4'-tetraethoxybenzophenone,
2,3,3',4'-tetramethoxybenzophenone,
2,3,3',4'-tetraethoxybenzophenone, and the like. Among these,
2,2'-dihydroxy-4-methoxybenzophenone,
2,2'-dihydroxy-4,4'-dimethoxybenzophenone, and
2,2',4,4'-tetrahydroxybenzophenone are particularly preferable.

It is possible to use the ultraviolet absorbing agent (B) in an amount of 0.3 to 10 parts by weight, preferably 0.5 to 3 parts by weight, with respect to 100 parts by weight of the compound (A). Within this range, it is possible to more effectively exhibit the effect of blocking light between harmful ultraviolet light and blue light of approximately 420 nm.

[Radical Polymerization Initiator (C)]

Next, a description of the radical polymerization initiator (C) in the present embodiment will be given.

The radical polymerization initiator (C) in the present embodiment is a radical polymerization initiator which is at least one kind selected from the group consisting of a peroxyketal-based radical polymerization initiator, a peroxymonocarbonate-based radical polymerization initiator, and a peroxyester-based radical polymerization initiator.

More specifically, as the radical polymerization initiator (C) of the present embodiment, a peroxyketal-based radical polymerization initiator (a) having a 10-hour half-life temperature of 80° C. or higher and represented by General Formula (6), and/or a peroxymonocarbonate-based radical polymerization initiator (b) having a 10-hour half-life temperature of 80° C. or higher and represented by General Formula (7), and/or a peroxyester-based radical polymerization initiator (c) having a 10-hour half-life temperature of 65° C. or higher and represented by General Formula (8) is used.

(6)

In Formula (6), $R_3$ is a tertiary alkyl group, $R_1$ and $R_2$ are each independently an alkyl group selected from methyl, ethyl, propyl, and butyl, the alkyl group may have, for example, a functional group such as an alkyl ester group on the terminal of the chain, or $R_1$ and $R_2$ may bond with each other to form a cycloalkylene group with the carbon atom bonded thereto, and the cycloalkylene group may have 1 to 3 alkyl substituents.

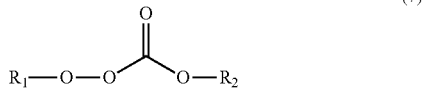

(7)

In Formula (7), $R_1$ is a tertiary alkyl group having 3 to 6 carbon atoms and $R_2$ is a linear or branched alkyl group having 3 to 8 carbon atoms.

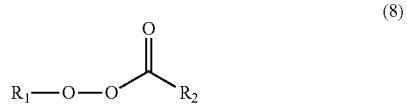

(8)

In Formula (8), $R_1$ is a tertiary alkyl group having 3 to 6 carbon atoms and $R_2$ is a linear or branched alkyl group having 3 to 9 carbon atoms or a phenyl group.

Examples of the peroxyketal-based radical polymerization initiator (a) {the content of the brackets indicates the 10-hour half-life temperature} include 1,1-bis(t-butylperoxy)-3,3,5-trimethylcyclohexane (83° C.), 1,1-bis(t-hexylperoxy)-3,3,5-trimethylcyclohexane (90° C.), 2,2-bis(t-butylperoxy) butane (107° C.), n-butyl-4,4-bis(t-butylperoxy) valerate (109° C.), ethyl 3,3-bis(t-butylperoxy) valerate (114° C.), 1,1-bis(t-butylperoxy) cyclohexane (91° C.), 1,1-bis(t-butylperoxy)-2-methylcyclohexane (83° C.), 1,1-bis(t-amylperoxy) cyclohexane (93° C.), 1,1-bis(t-hexylperoxy) cyclohexane (87° C.), 1,1-bis(t-hexylperoxy)-3,3,5-trimethylcyclohexane (87° C.), and 2,2-bis[4,4-(di-t-butylperoxy) cyclohexyl] propane (95° C.).

Examples of the peroxymonocarbonate-based radical polymerization initiator (b) {the content of the brackets indicates the 10-hour half-life temperature} include OO-(t-butyl)-O-isopropyl monoperoxycarbonate (99° C.), OO-(t-amyl)-O-isopropyl monoperoxycarbonate (96° C.), OO-(t-butyl)-O-(2-ethylhexyl) monoperoxycarbonate (99° C.), and OO-(t-amyl)-O-(2-ethylhexyl) monoperoxycarbonate (99° C.)

Examples of the peroxyester-based radical polymerization initiator (c) {the content of the brackets indicates the 10-hour half-life temperature} include t-butylperoxy-2-ethylhexanoate (72° C.), t-butylperoxyisobutyrate (82° C.), t-butylperoxy-3,3,5-trimethylhexanoate (97° C.), t-butylperoxyacetate (102° C.), t-butylperoxyisononanoate (102° C.), t-butylperoxybenzoate (104° C.), t-amylperoxy-2-ethylhexanoate (75° C.), t-amylperoxynormaloctoate (96° C.), t-amylperoxyacetate (100° C.), t-amylperoxyisononate (96° C.), t-amylperoxybenzoate (100° C.), t-hexylperoxy-2-ethylhexanoate (70° C.), t-hexylperoxybenzoate (99° C.), and 1,1,3,3-tetramethylbutylperoxy-2-ethylhexanoate (65° C.).

In the present embodiment, as the radical polymerization initiator (C), it is preferable to use the peroxyketal-based radical polymerization initiator (a) or the peroxymonocarbonate-based radical polymerization initiator (b), specifically, OO-(t-butyl)-O-(2-ethyl hexyl) monoperoxy carbonate, OO-(t-amyl)-O-(2-ethyl hexyl) monoperoxy carbonate, 1,1-bis(t-butylperoxy) cyclo hexane, 1,1-bis(t-amylperoxy) cyclo hexane, 1,1-bis(t-hexyl peroxy) cyclo hexane, 1,1-bis (t-hexyl peroxy)-3,3,5-trimethyl cyclo hexane, and the like are preferably used.

In the present embodiment, the use amount of the radical polymerization initiator (C) varies depending on the polymerization conditions, the kind of initiator, the purity of the initiator, the diluent used, and the composition of the compound (A) and is generally not limited; however, the use amount is 0.3 to 5.0 parts by weight with respect to 100 parts by weight of compound (A) including the allyloxycarbonyl group, preferably 0.5 to 3.0 parts by weight, and it is also possible to use a combination of two or more kinds of radical polymerization initiator.

In addition, when polymerizing the polymerizable composition for an optical material of the present embodiment, among the polymerization conditions, the temperature particularly affects the properties of the obtained cured product. Since this temperature condition is influenced by the kind and amount of the radical polymerization initiator (C) and the kind of the monomer, it is generally not possible to limit the condition; however, in general, it is preferable that the polymerization be started at a relatively low temperature, that the temperature be slowly raised, and that curing be carried out at a high temperature when finishing the polymerization. Since the polymerization time also varies depending on various factors in the same manner as the temperature, the optimum time is suitably determined in advance according to these conditions, but it is generally preferable to choose the conditions such that the polymerization is completed in 12 to 24 hours. In addition, the polymerizable composition for an optical material of the present embodiment has a high yield rate since not requiring strict control to 35° C. or lower and being curable even in a pattern of starting from 60° C. or higher.

[Dye (D)]

Examples of the dye (D) in the present embodiment include anthraquinone-based dyes, perinone-based dyes, monoazo-based dyes, diazo-based dyes, phthalocyanine-based dyes, and the like, and it is possible to use one type or a combination of two or more types.

Examples of anthraquinone-based dyes include Solvent Blue 36 (1,4-bis(isopropylamino) anthracene-9,10-dione), Solvent Blue 63 (1-(methylamino)-4-(m-tolylamino) anthracene-9,10-dione), Solvent Blue 94 (1-amino-2-bromo-4-(phenylamino) anthracene-9,10-dione), Solvent Blue 97 (1,4-bis((2,6-diethyl-4-methylphenyl) amino) anthracene-9,10-dione), Solvent Blue 104 (1,4-bis(mesitylamino) anthracene-9,10-dione), Solvent Violet 13 (1-hydroxy-4-(p-tolylamino) anthracene-9,10-dione), Solvent Violet 13 (1,5-bis (p-tolylamino) anthracene-9,10-dione), Solvent Red 52 (3-methyl-6-(p-tolylamino)-3H-naphtho[1,2,3-de] quinoline-2,7-dione), Solvent Red 168 (1-(cyclo hexyl amino) anthracene-9,10-dione), Solvent Red 207 (1,5-bis(cyclohexyl amino) anthracene-9,10-dione), Disperse Red 22 (1-(phenylamino) anthracene-9,10-dione), Disperse Red 60 (1-amino-4-hydroxy-2-phenoxy anthracene-9,10-dione), Solvent Violet 59 (1,4-diamino-2,3-diphenylanthracene-9,10-dione), Solvent Green 28 (1,4-bis((4-butylphenyl) amino)-5,8-dihydroxy anthracene-9,10-dione), and the like.

Examples of perinone-based dyes include Solvent Orange 60 (12H-isoindolo[2,1-a] perimidin-12-one), Solvent Orange 78, Solvent Orange 90, Solvent Red 135 (8,9,10,11-tetrachloro-12H-isoindolo[2,1-a] perimidin-12-one), Solvent Red 162, Solvent Red 179 (14H-benzo[4,5] isoquinolino[2,1-a] perimidin-14-one), and the like.

Examples of monoazo-based dyes include Solvent Red 195, Fast Orange R, Oil Red, Oil Yellow, and the like.

Examples of diazo-based dyes include Chicago Sky Blue 6B (Sodium6,6'-((1E,1'E)-(3,3'-dimethoxy-[1,1'-biphenyl]-4,4'-diyl) bis(diazene-2,1-diyl))bis(4-amino-5-hydroxynaphthalene-1,3-disulfonate)), Evans Blue (Sodium 6,6'-((1E,1'E)-(3,3'-dimethyl-[1,1'-biphenyl]-4,4'-diyl)bis(diaz ene-2,1-diyl))bis(4-amino-5-hydroxynaphthalene-1,3-disulfonate)), Direct Blue 15 (Sodium 3,3'-((1E,1'E)-(3,3'-dimethoxy-[1,1'-biphenyl]-4,4'-diyl)bis(diazene-2,1-diyl))bis(5-amino-4-hydroxynaphthalene-2,7-disulfonate)), Trypan Blue (Sodium 3,3'-((1E,1'E)-(3,3'-dimethyl-[1,1'-biphenyl]-4,4'-diyl)bis(diaz ene-2,1-diyl))bis(5-amino-4-hydroxynaphthalene-2,7-disulfonate)), Benzopurpurin 4B (Sodium 3,3'-((1E,1'E)-(3,3'-dimethyl-[1,1'-biphenyl]-4,4'-diyl)bis(diaz ene-2,1-diyl))bis(4-aminonaphthalene-1-sulfonate)), Congo Red (Sodium 3,3'-((1E,1'E)-[1,1'-biphenyl]-4,4'-diylbis(diazene-2,1-diyl))bis(4-amino naphthalene-1-sulfonate)), and the like.

Examples of phthalocyanine-based dyes include C.I. Direct Blue 86, C.I. Direct Blue 199, and the like.

In the present embodiment, from the viewpoint of obtaining an optical material with an effect of blocking blue light at approximately 420 nm, Yellowness (YI), and excellent transparency, Solvent Blue 94, Solvent Blue 97, Solvent Blue 104, Solvent Violet 59, Solvent Red 195, Disperse Red 60, Solvent Green 28, and Solvent Orange 60 are preferable, and the above may be used alone or in a combination of two or more kinds.

In the present embodiment, it is possible for the use amount of the dye (D) to be 0.1 to 100 ppm by weight with respect to 100 parts by weight of the compound (A), and 1 to 20 ppm by weight is preferable.

It is possible for the polymerizable composition for an optical material of the present embodiment to include a specific ultraviolet absorbing agent (B), a radical polymerization initiator (C), and a dye (D) along with the compound (A) including two or more allyloxycarbonyl groups. Due to this, it is possible to obtain a colorless and transparent resin which effectively exhibits an ultraviolet cutting function.

There are problems such as that the hue of the obtained resin deteriorates in a case where the addition amount of the ultraviolet absorbing agent is increased with respect to the compound including two or more allyloxycarbonyl groups in order to block blue light of approximately 420 nm. In addition, in a case where the hue deteriorates, there are methods for improving the hue of the resin by using a dye or the like; however, there are problems such as that, for example, the dye is decomposed by a peroxide compound used as a polymerization catalyst of polymerizable allyl carbonate and thus it is not possible to adjust the hue of the resin well. In addition, there may be cases where the ultraviolet absorbing agent is decomposed by the peroxide compound used as a polymerization catalyst of polymerizable allyl carbonate and the effect of blocking blue light of approximately 420 nm is not obtained.

According to the present embodiment, by using a combination of the specific ultraviolet absorbing agent (B), the radical polymerization initiator (C), and the specific dye (D), the ultraviolet absorbing agent (B) and the dye (D) are not decomposed and it is possible to obtain a resin having an effect of blocking blue light of approximately 420 nm, a good hue, and transparency.

[Other Components]

In the present embodiment, in addition to the components (A) to (D) described above, additives such as an internal release agent and a resin modifier may be further included.

As the internal release agent, it is possible to use an acidic phosphate ester or a nonreactive silicone oil. Examples of acidic phosphate esters include phosphoric monoesters and phosphoric diesters and it is possible to use the above alone or in a mixture of two or more kinds.

Examples of resin modifiers include an olefin compound including an episulfide compound, an alcohol compound, an amine compound, an epoxy compound, an organic acid and an anhydride thereof, a (meth)acrylate compound, and the like.

<Method for Producing Polymerizable Composition for an Optical Material>

It is possible to prepare the polymerizable composition for an optical material of the present embodiment by mixing the following as a batch, a compound (A) including two or more allyloxycarbonyl groups represented by General Formula (1), an ultraviolet absorbing agent (B) represented by General Formula (i), at least one kind of radical polymerization initiator (C) selected from the group consisting of a peroxyketal-based radical polymerization initiator, peroxymonocarbonate-based radical polymerization initiator, and peroxyester-based radical polymerization initiator, and at least one kind of dye (D) selected from an anthraquinone-based dye, a perinone-based dye, a monoazo-based dye, a diazo-based dye, and a phthalocyanine-based dye.

In a case of mixing component (A) to component (D) to prepare a polymerizable composition, the temperature is usually 25° C. or lower. From the viewpoint of the pot life of the polymerizable composition, it may be preferable to further lower the temperature. However, in a case where the solubility of the catalyst, the internal release agent, and the additive in the monomer is not good, it is also possible to previously heat and dissolve the above in the monomer and the resin modifier.

In the present embodiment, the method for producing the resin molded article is not particularly limited, but examples of preferable production methods include cast polymerization. First, a polymerizable composition is injected to a space between two molds held by a gasket, a tape, or the like. At this time, depending on the physical properties required for the plastic lens to be obtained, in many cases, it is preferable to carry out degassing treatment under reduced pressure, a filtration treatment such as pressurization and depressurization, and the like as necessary.

Since the polymerization conditions vary greatly depending on the composition of the polymerizable composition, the type and amount of the catalyst used, the shape of the mold, and the like, the conditions are not limited, but the above are performed for approximately 1 to 50 hours at a temperature of 0 to 150° C. In some cases, it is preferable to carry out the curing while holding in a temperature range of 20 to 130° C., or gradually raising the temperature, for 1 to 48 hours.

The resin molded article may be subjected to a treatment such as annealing as necessary. The treatment temperature is usually performed at 50 to 150° C., but is preferably performed at 90 to 140° C., and more preferably performed at 100 to 130° C.

In the present embodiment, when molding the resin, in addition to the above-mentioned "other components", in accordance with the purpose, in the same manner as known molding methods, various additives such as a chain extender, a cross-linking agent, a light stabilizer, an antioxidant, oil soluble dye, filler, adhesion improver, and the like may be added.

<Use>

It is possible to obtain the poly(allyl carbonate) and poly(allyl ester) resins obtained from the polymerizable composition for an optical material of the present embodiment as molded articles of various shapes by changing the type of mold during cast polymerization.

The resin molded article of the present embodiment has a superior effect of blocking light between harmful ultraviolet light and blue light of approximately 420 nm, has an excellent colorless, transparent, external appearance, and is capable of being used for various optical materials such as plastic lenses. In particular, it is possible to suitably use the resin molded article as a plastic spectacle lens.

[Plastic Spectacle Lens]

The plastic spectacle lens using the lens base material including the molded article of the present embodiment may be used after application of a coating layer on one surface or both surfaces thereof as necessary.

The plastic spectacle lens of the present embodiment includes a lens base material including the polymerizable composition described above and a coating layer.

Specific examples of the coating layer include a primer layer, a hard coat layer, an anti-reflection layer, an anti-fog coating layer, an anti-fouling layer, a water repellent layer, and the like. It is also possible to use each of these coating layers alone, or to use a plurality of coating layers in multiple layers. In a case of applying coating layers on both surfaces, the same coating layer may be applied to each side or different coating layers may be applied to each side.

In each of these coating layers, an infrared absorber for the purpose of protecting eyes from infrared rays, a light stabilizer, an antioxidant, and a photochromic compound for the purpose of improving the weather resistance of the lens, and a dye or a pigment for the purpose of improving the fashionability of the lens, an antistatic agent, and other known additives for enhancing the performance of the lens may be used in combination.

Various leveling agents for the purpose of improving applicability may be used for layers to be coated by application.

The primer layer is usually formed between a hard coat layer described below and a lens. The primer layer is a coating layer for the purpose of improving the adhesion between the hard coat layer formed thereon and the lens, and in some cases, it is also possible to improve the impact resistance. It is possible to use any material as the primer layer as long as the material has high adhesion to the obtained lens, but in general, a primer composition mainly formed of a urethane-based resin, an epoxy-based resin, a polyester-based resin, a melanin-based resin, a polyvinyl acetal, or the like is used. The primer composition may be used with an appropriate solvent which does not affect the lens, for the purpose of adjusting the viscosity of the composition. Naturally, the primer composition may be used without a solvent.

It is possible to form the primer layer by either a coating method or a dry method. In a case of using a coating method, a primer layer is formed by applying the primer composition to a lens by a known coating method such as spin coating, dip coating, or the like and then solidifying the primer composition. In a case where the drying method is used, the primer layer is formed by a known dry method such as a CVD method or a vacuum deposition method. When forming the primer layer, the surface of the lens may be subjected to a pretreatment such as an alkali treatment, a plasma treatment, an ultraviolet treatment, and the like as necessary for the purpose of improving the adhesion.

The hard coat layer is a coating layer for the purpose of imparting functions such as scratch resistance, abrasion resistance, moisture resistance, hot water resistance, heat resistance, weather resistance, and the like to the lens surface.

Generally, for the hard coat layer, a hard coat composition including an organosilicon compound having curability and one or more kinds of oxide fine particles of elements selected from the element group of Si, Al, Sn, Sb, Ta, Ce, La, Fe, Zn, W, Zr, In, and Ti and/or one kind or more of fine particles formed of composite oxides of two or more kinds of elements selected from this group of elements is used.

In addition to the above components, it is preferable for the hard coat composition to include at least one of amines, amino acids, metal acetylacetonate complexes, metal salts of organic acids, perchloric acids, salts of perchloric acids, acids, metal chlorides, and polyfunctional epoxy compounds. The hard coat composition may be used with an appropriate solvent which does not affect the lens or may be used without solvent.

The hard coat layer is usually formed by applying a hard coat composition by a known coating method such as spin coating or dip coating and then curing the composition. Examples of curing methods include heat curing and a method of curing by energy ray irradiation such as ultraviolet ray or visible light. In order to suppress the occurrence of interference fringes, it is preferable that the difference in refractive index of the hard coat layer and the lens be within a range of ±0.1.

The antireflection layer is usually formed on the hard coat layer as necessary. There are organic type and inorganic type antireflection layers and, in the case of an inorganic type, inorganic oxides such as $SiO_2$, $TiO_2$, and the like are used, and the antireflection layer is formed by a dry method such as a vacuum deposition method, a sputtering method, an ion plating method, an ion beam assist method, a CVD method or the like. In the case of an organic type, the antireflection layer is formed by a wet process using a composition including an organosilicon compound and silica-based fine particles having an internal cavity.

There are single layer and multiple-layer antireflection layers, and in the case of use as a single layer, it is preferable that the refractive index be lower than the refractive index of the hard coat layer by at least 0.1. In order to effectively exhibit the antireflection function, it is preferable to form a multilayer antireflection film, in which case a low refractive index film and a high refractive index film are alternately laminated. Also in this case, the refractive index difference between the low refractive index film and the high refractive index film is preferably 0.1 or more. Examples of high refractive index films include films of ZnO, $TiO_2$, $CeO_2$, $Sb_2O_5$, $SnO_2$, $ZrO_2$, $Ta_2O_5$, and the like, and examples of low refractive index films include $SiO_2$ films and the like.

On the antireflection layer, an antifogging layer, an antifouling layer, a water repellent layer may be formed, as necessary. The method for forming the antifogging layer, the antifouling layer, and the water repellent layer is not particularly limited as long as there is no adverse effect on the antireflection function, the processing method, the processing material, and the like are not particularly limited and it is possible to use known antifogging treatment methods, antifouling treatment methods, water repellent treatment methods, and materials. Examples of antifogging treatment methods and antifouling treatment methods include a method of covering the surface with a surfactant, a method of adding a hydrophilic film to the surface to impart water absorbency, a method of covering the surface with fine irregularities to increase the water absorbency, a method of using photocatalytic activity to impart water absorbency, a method of carrying out a super water repellent treatment to prevent adhesion of water droplets, and the like. In addition, examples of water repellent treatment methods include a method of forming a water repellent treated layer by vapor deposition or sputtering of a fluorine-containing silane compound or the like, a method of dissolving the fluorine-containing silane compound in a solvent, followed by coating to form a water repellent treated layer, and the like.

EXAMPLES

A specific description will be given below of the present invention based on examples, but the present invention is not limited to these examples. The molded article comprised of the cured resin and the plastic lens were evaluated by the following method.

Resin Yellowness Index (YI): The YI of the obtained molded article (flat plate having a thickness of 2 mm) was measured with a spectrocolorimeter CM-5 manufactured by Konica Minolta Inc.

Light cut ratio at 420 nm wavelength: The transmittance at a wavelength of 420 nm of the obtained molded article (flat plate having a thickness of 2 mm) was measured with an ultraviolet and visible spectrophotometer UV-1600 manufactured by Shimadzu Corporation, and the light cutting rate at 420 nm defined by the following calculation formula was calculated.

Light cut ratio (%) at 420 nm wavelength=100(%)−(transmittance at wavelength of 420 nm) (%)

Haze value: The obtained molded article (flat plate with a thickness of 2 mm) was measured for haze in accordance with ASTM D 1003 with a digital haze meter haze-gard plus manufactured by BYK-Gardner.

Total light transmittance: The obtained molded article (flat plate with a thickness of 2 mm) was measured for total light transmittance in accordance with ASTM D 1003 with a digital haze meter haze-gard plus manufactured by BYK-Gardner.

In the Examples, the following components were used.
(Polymerizable Compound)
RAV 7MC (poly(allyl carbonate) compound of diethylene glycol, neopentyl glycol, and pentaerythritol, and oligomers thereof, manufactured by Acomon)
RAV 7AT (poly(allyl carbonate) compound of diethylene glycol and pentaerythritol, and oligomers thereof, manufactured by Acomon)
RAV 755T (a mixture of an allyl ester compound, an allyl carbonate compound, and compounds having an allyl ester group and an allyl carbonate group, obtained by ester replacement of a mixture of dimethyl terephthalate, allyl alcohol, diallyl carbonate, and diethylene glycol, manufactured by Acomon)
(Ultraviolet Absorbing Agent)
Uvinul 3049 (2,2'-dihydroxy-4,4'-dimethoxybenzophenone, manufactured by BASF)
DHMBP (2,2'-dihydroxy-4-methoxybenzophenone, manufactured by Tokyo Chemical Industry Co., Ltd).
HMBP (2-hydroxy-4-methoxybenzophenone, manufactured by Tokyo Chemical Industry Co., Ltd).
HOBP (2-hydroxy-4-n-octyloxybenzophenone, manufactured by Tokyo Chemical Industry Co., Ltd).
DMBP (4,4'-dimethoxybenzophenone, manufactured by Tokyo Chemical Industry Co., Ltd).
PBP (4-phenoxybenzophenone, manufactured by Tokyo Chemical Industry Co., Ltd).
(Radical Polymerization Initiator)
Luperox TAEC (OO-(t-amyl)-O-(2-ethylhexyl) monoperoxycarbonate, manufactured by Arkema)
Trigonox 29-C75 (75% solution of 1,1-bis(t-butylperoxy)-3,3,5-trimethylcyclohexane, manufactured by AkzoNobel)
Luperox 531M80 (80% solution of 1,1-bis(t-amylperoxy)cyclohexane, manufactured by Arkema Yoshitomi, Ltd.)
ADC 30 (diethylene glycol bis(allyl carbonate) solution including 30 parts by weight of isopropyl isobutylperoxydicarbonate, manufactured by AkzoNobel)
(Bluing Agent (Dye-Based))
Macrolex Blue RR (Solvent Blue 97, manufactured by Lanxess)
Plast Blue 8520 (Solvent Blue 94, manufactured by Arimoto Chemical Co., Ltd.)
Solvaperm Red Violet R (Solvent Violet 59, manufactured by Clariant)
Solvaperm Red BB (Solvent Red 195, manufactured by Clariant) (Bluing agent (pigment-based))
RAV 755 (R) Bluing agent (manufactured by Acomon)
Here, the addition amount of the bluing agent (dye-based) is the amount with respect to the composition to be obtained.

Example 1

Uvinul 3049 (manufactured by BASF) 1.5 parts by weight, Macrolex Blue RR (manufactured by Lanxess) 6 ppm, and Solvaperm Red Violet R (manufactured by Clariant) 6 ppm were dissolved at 70° C. with respect to RAV 7MC (manufactured by Acomon) 99.2 parts by weight and cooled to room temperature, then Luperox Taec (manufactured by Arkema) 0.8 parts by weight was added thereto as a radical polymerization initiator and the resultant was injected into a mold in which the outer periphery of two disc-shaped glass plates was wrapped with an adhesive tape, and polymerized for 24 hours while gradually raising the temperature from room temperature to 120° C. Thereafter, the polymerizable composition was released from the mold and heated at 120° C. for 1 hour to carry out post-polymerization to obtain a flat plate having a thickness of 2 mm. The obtained resin flat plate cut the light rays of 420 run by approximately 80%, the hue was good, and the transparency was high.

Example 2

Uvinul 3049 (manufactured by BASF) 1.5 parts by weight, Macrolex Blue RR (manufactured by Lanxess) 6 ppm, and Solvaperm Red Violet R (manufactured by Clariant) 6 ppm were dissolved at 70° C. with respect to RAV 7MC (manufactured by Acomon) 98.0 parts by weight and cooled to room temperature, then Trigonox 29-C75 (manufactured by AkzoNobel) 2.0 parts by weight was added thereto as a radical polymerization initiator and the resultant was injected into a mold in which the outer periphery of two disc-shaped glass plates was wrapped with an adhesive tape, and polymerized for 25 hours while gradually raising the temperature from room temperature to 110° C. Thereafter, the polymerizable composition was released from the mold and heated at 120° C. for 1 hour to carry out post-polymerization to obtain a flat plate having a thickness of 2 mm. The obtained resin flat plate cut the light rays of 420 nm by approximately 80%, the hue was good, and the transparency was high.

Example 3

Uvinul 3049 (manufactured by BASF) 1.5 parts by weight, Plast Blue 8520 (manufactured by Arimoto Chemical Co., Ltd.) 6.25 ppm, and Solvaperm Red Violet R (manufactured by Clariant) 3 ppm were dissolved at 70° C. with respect to RAV 7MC (manufactured by Acomon) 99.2 parts by weight and cooled to room temperature, then Luperox 531M80 (manufactured by Arkema Yoshitomi, Ltd.) 0.8 parts by weight was added thereto as a radical polymerization initiator and the resultant was injected into a mold in which the outer periphery of two disc-shaped glass plates was wrapped with an adhesive tape, and polymerized for 21 hours while gradually raising the temperature from room temperature to 110° C. Thereafter, the polymerizable composition was released from the mold and heated at 120° C. for 2 hours to carry out post-polymerization to obtain a flat plate having a thickness of 2 mm. The obtained resin flat plate cut the light rays of 420 nm by approximately 80%, the hue was good, and the transparency was high.

Example 4

Uvinul 3049 (manufactured by BASF) 1.5 parts by weight, Plast Blue 8520 (manufactured by Arimoto Chemical Co., Ltd.) 9 ppm, and Solvaperm Red BB (manufactured by Clariant) 5 ppm were dissolved at 70° C. with respect to RAV 7MC (manufactured by Acomon) 99.2 parts by weight and cooled to room temperature, then Luperox 531M80 (manufactured by Arkema Yoshitomi, Ltd.) 0.8 parts by weight was added thereto as a radical polymerization initiator and the resultant was injected into a mold in which the outer periphery of two disc-shaped glass plates was wrapped with an adhesive tape, and polymerized for 21 hours while gradually raising the temperature from room temperature to 110° C. Thereafter, the polymerizable composition was released from the mold and heated at 120° C. for 2 hours to carry out post-polymerization to obtain a flat plate having a thickness of 2 mm. The obtained resin flat plate cut the light rays of 420 nm by approximately 80%, the hue was good, and the transparency was high.

Example 5

2,2'-dihydroxy-4-methoxybenzophenone (manufactured by Tokyo Chemical Industry Co., Ltd.) (DHMBP) 1.5 parts by weight, Plast Blue 8520 (manufactured by Arimoto Chemical Co., Ltd.) 6.25 ppm, and Solvaperm Red Violet R (manufactured by Clariant) 3 ppm were dissolved at 70° C. with respect to RAV 7MC (manufactured by Acomon) 99.2 parts by weight and cooled to room temperature, then Luperox 531M80 (manufactured by Arkema Yoshitomi, Ltd.) 0.8 parts by weight was added thereto as a radical polymerization initiator and the resultant was injected into a mold in which the outer periphery of two disc-shaped glass plates was wrapped with an adhesive tape, and polymerized for 21 hours while gradually raising the temperature from room temperature to 110° C. Thereafter, the polymerizable composition was released from the mold and heated at 120° C. for 2 hours to carry out post-polymerization to obtain a flat plate having a thickness of 2 mm. The obtained resin flat plate cut the light rays of 420 nm by approximately 80%, the hue was good, and the transparency was high.

Example 6

Uvinul 3049 (manufactured by BASF) 1.0 part by weight, Macrolex Blue RR (manufactured by Lanxess) 6 ppm, and Solvaperm Red Violet R (manufactured by Clariant) 6 ppm were dissolved at 70° C. with respect to RAV 7AT (manufactured by Acomon) 98.8 parts by weight and cooled to room temperature, then Luperox TAEC (manufactured by Arkema) 1.2 parts by weight was added thereto as a radical polymerization initiator and the resultant was injected into a mold in which the outer periphery of two disc-shaped glass plates was wrapped with an adhesive tape, and polymerized for 24 hours while gradually raising the temperature from room temperature to 120° C. Thereafter, the polymerizable composition was released from the mold and heated at 120° C. for 1 hour to carry out post-polymerization to obtain a flat plate having a thickness of 2 mm. The obtained resin flat plate cut the light rays of 420 nm by approximately 70%, the hue was good, and the transparency was high.

Example 7

Uvinul 3049 (manufactured by BASF) 1.0 part by weight, Macrolex Blue RR (manufactured by Lanxess) 5 ppm, and Solvaperm Red Violet R (manufactured by Clariant) 7 ppm were dissolved at 70° C. with respect to RAV 755T (manufactured by Acomon) 99.2 parts by weight and cooled to room temperature, then Luperox TAEC (manufactured by Arkema) 0.8 parts by weight was added thereto as a radical polymerization initiator and the resultant was injected into a mold in which the outer periphery of two disc-shaped glass plates was wrapped with an adhesive tape, and polymerized for 24 hours while gradually raising the temperature from room temperature to 120° C. Thereafter, the polymerizable composition was released from the mold and heated at 120° C. for 1 hour to carry out post-polymerization to obtain a flat plate having a thickness of 2 mm. The obtained resin flat plate cut the light rays of 420 nm by approximately 80%, the hue was good, and the transparency was high.

Comparative Example 1

Uvinul 3049 (manufactured by BASF) 1.5 parts by weight was dissolved at 70° C. with respect to RAV 7MC (manufactured by Acomon) 99.2 parts by weight and cooled to room temperature, then Luperox Taec (manufactured by Arkema) 0.8 parts by weight was added thereto as a radical polymerization initiator and the resultant was injected into a mold in which the outer periphery of two disc-shaped glass plates was wrapped with an adhesive tape, and polymerized for 24 hours while gradually raising the temperature from room temperature to 120° C. Thereafter, the polymerizable composition was released from the mold and heated at 120° C. for 1 hour to carry out post-polymerization to obtain a flat plate having a thickness of 2 mm. The obtained resin flat plate cut the light rays of 420 nm by approximately 80%, but the hue was yellow.

Comparative Example 2

Uvinul 3049 (manufactured by BASF) 1.5 parts by weight was dissolved at 70° C. with respect to RAV 7MC (manufactured by Acomon) 98.0 parts by weight and cooled to room temperature, then Trigonox 29-C75 (manufactured by AkzoNobel) 2.0 parts by weight was added thereto as a radical polymerization initiator and the resultant was injected into a mold in which the outer periphery of two disc-shaped glass plates was wrapped with an adhesive tape, and polymerized for 25 hours while gradually raising the temperature from room temperature to 110° C. Thereafter, the polymerizable composition was released from the mold and heated at 120° C. for 1 hour to carry out post-polymerization to obtain a flat plate having a thickness of 2 mm. The obtained resin flat plate cut the light rays of 420 nm by approximately 80%, but the hue was yellow.

Comparative Example 3

Uvinul 3049 (manufactured by BASF) 1.0 part by weight was dissolved at 70° C. with respect to RAV 755T (manufactured by Acomon) 99.2 parts by weight and cooled to room temperature, then Luperox TAEC (manufactured by Arkema) 0.8 parts by weight was added thereto as a radical polymerization initiator and the resultant was injected into a mold in which the outer periphery of two disc-shaped glass plates was wrapped with an adhesive tape, and polymerized for 24 hours while gradually raising the temperature from room temperature to 120° C. Thereafter, the polymerizable composition was released from the mold and heated at 120° C. for 1 hour to carry out post-polymerization to obtain a flat plate having a thickness of 2 mm. The obtained resin flat plate cut the light rays of 420 nm by approximately 80%, but the hue was yellow.

Comparative Example 4

Uvinul 3049 (manufactured by BASF) 1.0 part by weight was dissolved at 70° C. with respect to RAV 7AT (manufactured by Acomon) 89.0 parts by weight and cooled to room temperature, then ADC 30 (manufactured by Akzo Nobel) 11.0 parts by weight was added thereto as a radical polymerization initiator and the resultant was injected into a mold in which the outer periphery of two disc-shaped glass plates was wrapped with an adhesive tape, and polymerized for 20 hours while gradually raising the temperature from room temperature to 80° C. Thereafter, the polymerizable composition was released from the mold and heated at 110° C. for 2 hours to carry out post-polymerization to obtain a flat plate having a thickness of 2 mm. The obtained resin flat plate cut the light rays of 420 nm by approximately 80%, but the hue was yellow.

Comparative Example 5

2,2'-dihydroxy-4-methoxybenzophenone (manufactured by Tokyo Chemical Industry Co., Ltd.) (DHMBP) 1.0 part by weight, was dissolved at 70° C. with respect to RAV 7AT (manufactured by Acomon) 89.0 parts by weight and cooled to room temperature, then ADC 30 (manufactured by Akzo Nobel) 11.0 parts by weight was added thereto as a radical polymerization initiator and the resultant was injected into a mold in which the outer periphery of two disc-shaped glass plates was wrapped with an adhesive tape, and polymerized for 20 hours while gradually raising the temperature from room temperature to 80° C. Thereafter, the polymerizable composition was released from the mold and heated at 110° C. for 2 hours to carry out post-polymerization to obtain a flat plate having a thickness of 2 mm. The obtained resin flat plate cut the light rays of 420 run by approximately 80%, but the hue was yellow.

Comparative Example 6

Uvinul 3049 (manufactured by BASF) 1.0 part by weight, Macrolex Blue RR (manufactured by Lanxess) 6 ppm, and Solvaperm Red Violet R (manufactured by Clariant) 6 ppm were dissolved at 70° C. with respect to RAV 7MC (manufactured by Acomon) 90.0 parts by weight and cooled to room temperature, then ADC 30 (manufactured by Akzo Nobel) 10.0 parts by weight was added thereto as a radical polymerization initiator and the resultant was injected into a mold in which the outer periphery of two disc-shaped glass plates was wrapped with an adhesive tape, and polymerized for 20 hours while gradually raising the temperature from room temperature to 80° C. Thereafter, the polymerizable composition was released from the mold and heated at 110° C. for 2 hours to carry out post-polymerization to obtain a flat plate having a thickness of 2 mm. The obtained resin flat plate cut the light rays of 420 run by approximately 80%, but the hue was yellow.

Comparative Example 7

Uvinul 3049 (manufactured by BASF) 1.0 part by weight, Macrolex Blue RR (manufactured by Lanxess) 6 ppm, and Solvaperm Red Violet R (manufactured by Clariant) 6 ppm were dissolved at 70° C. with respect to RAV 7AT (manufactured by Acomon) 89.0 parts by weight and cooled to room temperature, then ADC 30 (manufactured by Akzo Nobel) 11.0 parts by weight was added thereto as a radical polymerization initiator and the resultant was injected into a mold in which the outer periphery of two disc-shaped glass plates was wrapped with an adhesive tape, and polymerized for 20 hours while gradually raising the temperature from room temperature to 80° C. Thereafter, the polymerizable composition was released from the mold and heated at 110° C. for 2 hours to carry out post-polymerization to obtain a flat plate having a thickness of 2 mm. The obtained resin flat plate cut the light rays of 420 nm by approximately 80%, but the hue was yellow.

Comparative Example 8

Uvinul 3049 (manufactured by BASF) 1.0 part by weight was dissolved at 70° C. with respect to RAV 7AT (manufactured by Acomon) 89.0 parts by weight and cooled to room temperature, then RAV 755(R) Bluing agent 0.5 parts by weight as a pigment dispersion liquid, and ADC 30 (manufactured by Akzo Nobel) 11.0 parts by weight as a radical polymerization initiator were added thereto and mixed, then the mixture was filtered through a 5 μm PTFE filter, and the resultant was injected into a mold in which the outer periphery of two disc-shaped glass plates was wrapped with an adhesive tape, and polymerized for 20 hours while gradually raising the temperature from room temperature to 80° C. Thereafter, the polymerizable composition was released from the mold and heated at 110° C. for 2 hours to carry out post-polymerization to obtain a flat plate having a thickness of 2 mm. The obtained resin flat plate cut the light rays of 420 nm by approximately 80%, the hue was neutral color, but there was turbidity.

Comparative Example 9

Uvinul 3049 (manufactured by BASF) 1.5 parts by weight was dissolved at 70° C. with respect to RAV 7MC (manufactured by Acomon) 99.2 parts by weight and cooled to room temperature, then RAV 755(R) Bluing agent 0.5 parts by weight as a pigment dispersion liquid, and Luperox TAEC (manufactured by Arkema) 0.8 parts by weight as a radical polymerization initiator were added thereto and mixed, then the mixture was filtered through a 5 μm PTFE filter, and the resultant was injected into a mold in which the outer periphery of two disc-shaped glass plates was wrapped with an adhesive tape, and polymerized for 24 hours while gradually raising the temperature from room temperature to 120° C. Thereafter, the polymerizable composition was released from the mold and heated at 120° C. for 1 hour to carry out post-polymerization to obtain a flat plate having a thickness of 2 mm. The obtained resin flat plate cut the light rays of 420 nm by approximately 80%, the hue was a neutral color, but there was turbidity.

Comparative Example 10

2-hydroxy-4-methoxybenzophenone (manufactured by Tokyo Chemical Industry Co., Ltd.) (MBP) 1.5 parts by weight, Plast Blue 8520 (manufactured by Arimoto Chemical Co., Ltd.) 1.8 ppm, and Solvaperm Red Violet R (manufactured by Clariant) 0.6 ppm were dissolved at 70° C. with respect to RAV 7MC (manufactured by Acomon) 99.2 parts by weight and cooled to room temperature, then Luperox 531M80 (manufactured by Arkema Yoshitomi, Ltd.) 0.8 parts by weight was added thereto as a radical polymerization initiator and the resultant was injected into a mold in which the outer periphery of two disc-shaped glass plates was wrapped with an adhesive tape, and polymerized for 21 hours while gradually raising the temperature from room temperature to 110° C. Thereafter, the polymerizable composition was released from the mold and heated at 120° C. for 2 hours to carry out post-polymerization to obtain a flat plate having a thickness of 2 mm. The obtained resin flat plate cut only approximately 18% of the light rays of 420 nm.

Comparative Example 11

2-hydroxy-4-n-octyloxybenzophenone (manufactured by Tokyo Chemical Industry Co., Ltd.) (HOBP) 1.5 parts by weight, Plast Blue 8520 (manufactured by Arimoto Chemical Co., Ltd.) 1.8 ppm, and Solvaperm Red Violet R (manufactured by Clariant) 0.6 ppm were dissolved at 70° C. with respect to RAV 7MC (manufactured by Acomon) 99.2 parts by weight and cooled to room temperature, then Luperox 531M80 (manufactured by Arkema Yoshitomi, Ltd.) 0.8 parts by weight was added thereto as a radical polymerization initiator and the resultant was injected into a mold in which the outer periphery of two disc-shaped glass plates was wrapped with an adhesive tape, and polymerized for 21 hours while gradually raising the temperature from room temperature to 110° C. Thereafter, the polymerizable composition was released from the mold and heated at 120° C. for 2 hours to carry out post-polymerization to obtain a flat plate having a thickness of 2 mm. The obtained resin flat plate cut only approximately 17% of the light rays of 420 nm.

Comparative Example 12

4,4'-dimethoxybenzophenone (manufactured by Tokyo Chemical Industry Co., Ltd.) (DMBP) 1.5 parts by weight, Plast Blue 8520 (manufactured by Arimoto Chemical Co., Ltd.) 1.8 ppm, and Solvaperm Red Violet R (manufactured by Clariant) 0.6 ppm were dissolved at 70° C. with respect to RAV 7MC (manufactured by Acomon) 99.2 parts by weight and cooled to room temperature, then Luperox 531M80 (manufactured by Arkema Yoshitomi, Ltd.) 0.8 parts by weight was added thereto as a radical polymerization initiator and the resultant was injected into a mold in which the outer periphery of two disc-shaped glass plates was wrapped with an adhesive tape, and polymerized for 21 hours while gradually raising the temperature from room temperature to 110° C. Thereafter, the polymerizable composition was released from the mold and heated at 120° C. for 2 hours to carry out post-polymerization to obtain a flat plate having a thickness of 2 mm. The obtained resin flat plate cut only approximately 10% of the light rays of 420 nm.

Comparative Example 13

4-phenoxybenzophenone (manufactured by Tokyo Chemical Industry Co., Ltd.) (PBP) 1.5 parts by weight, Plast Blue 8520 (manufactured by Arimoto Chemical Co., Ltd.) 1.8 ppm, and Solvaperm Red Violet R (manufactured by Clariant) 0.6 ppm were dissolved at 70° C. with respect to RAV 7MC (manufactured by Acomon) 99.2 parts by weight and cooled to room temperature, then Luperox 531M80 (manufactured by Arkema Yoshitomi, Ltd.) 0.8 parts by weight was added thereto as a radical polymerization initiator and the resultant was injected into a mold in which the outer periphery of two disc-shaped glass plates was wrapped with an adhesive tape, and polymerized for 21 hours while gradually raising the temperature from room temperature to 110° C. Thereafter, the polymerizable composition was released from the mold and heated at 120° C. for 2 hours to carry out post-polymerization to obtain a flat plate having a thickness of 2 mm. The obtained resin flat plate cut only approximately 15% of the light rays of 420 nm.

TABLE 1

| | Polymerizable compound | | Radical polymerization initiator | | Ultraviolet absorbing agent |
|---|---|---|---|---|---|
| | Name | Added amount (parts by weight) | Name | Added amount (parts by weight) | Name |
| Example 1 | RAV 7MC | 99.2 | Luperox TAEC | 0.8 | Uvinul 3049 |
| Example 2 | RAV 7MC | 98.0 | Trigonox 29-C75 | 2.0 | Uvinul 3049 |
| Example 3 | RAV 7MC | 99.2 | Luperox 531M80 | 0.8 | Uvinul 3049 |
| Example 4 | RAV 7MC | 99.2 | Luperox 531M80 | 0.8 | Uvinul 3049 |
| Example 5 | RAV 7MC | 99.2 | Luperox 531M80 | 0.8 | DHMBP |
| Example 6 | RAV 7AT | 98.8 | Luperox TAEC | 1.2 | Uvinul 3049 |
| Example 7 | RAV 755T | 99.2 | Luperox TAEC | 0.8 | Uvinul 3049 |
| Comparative Example 1 | RAV 7MC | 99.2 | Luperox TAEC | 0.8 | Uvinul 3049 |
| Comparative Example 2 | RAV 7MC | 98.0 | Trigonox 29-C75 | 2.0 | Uvinul 3049 |
| Comparative Example 3 | RAV 755T | 99.2 | Luperox TAEC | 0.8 | Uvinul 3049 |
| Comparative Example 4 | RAV 7AT | 89.0 | ADC 30 | 11.0 | Uvinul 3049 |
| Comparative Example 5 | RAV 7AT | 89.0 | ADC 30 | 11.0 | DHMBP |
| Comparative Example 6 | RAV 7MC | 90.0 | ADC 30 | 10.0 | Uvinul 3049 |
| Comparative Example 7 | RAV 7AT | 89.0 | ADC 30 | 11.0 | Uvinul 3049 |
| Comparative Example 8 | RAV 7AT | 89.0 | ADC 30 | 11.0 | Uvinul 3049 |
| Comparative Example 9 | RAV 7MC | 99.2 | Luperox TAEC | 0.8 | Uvinul 3049 |
| Comparative Example 10 | RAV 7MC | 99.2 | Luperox 531M80 | 0.8 | HMBP |
| Comparative Example 11 | RAV 7MC | 99.2 | Luperox 531M80 | 0.8 | HOBP |
| Comparative Example 12 | RAV 7MC | 99.2 | Luperox 531M80 | 0.8 | DMBP |
| Comparative Example 13 | RAV 7MC | 99.2 | Luperox 531M80 | 0.8 | PBP |

TABLE 1-continued

| | Ultraviolet absorbing agent Added amount (parts by weight) | Bluing Agent Kind | Name | Added amount |
|---|---|---|---|---|
| Example 1 | 1.5 | Dye | Macrolex Blue RR | 6 ppm |
| | | | Solvaperm Red Violet R | 6 ppm |
| Example 2 | 1.5 | Dye | Macrolex Blue RR | 6 ppm |
| | | | Solvaperm Red Violet R | 6 ppm |
| Example 3 | 1.5 | Dye | Plast Blue 8520 | 6.25 ppm |
| | | | Solvaperm Red Violet R | 3 ppm |
| Example 4 | 1.5 | Dye | Plast Blue 8520 | 9 ppm |
| | | | Solvaperm Red BB | 5 ppm |
| Example 5 | 1.5 | Dye | Plast Blue 8520 | 6.25 ppm |
| | | | Solvaperm Red Violet R | 3 ppm |
| Example 6 | 1.0 | Dye | Macrolex Blue RR | 6 ppm |
| | | | Solvaperm Red Violet R | 6 ppm |
| Example 7 | 1.0 | Dye | Macrolex Blue RR | 5 ppm |
| | | | Solvaperm Red violet R | 7 ppm |
| Comparative Example 1 | 1.5 | — | — | — |
| Comparative Example 2 | 1.5 | — | — | — |
| Comparative Example 3 | 1.0 | — | — | — |
| Comparative Example 4 | 1.0 | — | — | — |
| Comparative Example 5 | 1.0 | — | — | — |
| Comparative Example 6 | 1.0 | Dye | Macrolex Blue RR | 6 ppm |
| | | | Solvaperm Red Violet R | 6 ppm |
| Comparative Example 7 | 1.0 | Dye | Macrolex Blue RR | 6 ppm |
| | | | Solvaperm Red Violet R | 6 ppm |
| Comparative Example 8 | 1.0 | Pigment | RAV 755 ® Bluing agent | 0.5 parts by weight |
| Comparative Example 9 | 1.5 | Pigment | RAV 755 ® Bluing agent | 0.5 parts by weight |
| Comparative Example 10 | 1.5 | Dye | Plast Blue 8520 | 1.8 ppm |
| | | | Solvaperm Red violet R | 0.6 ppm |
| Comparative Example 11 | 1.5 | Dye | Plast Blue 8520 | 1.8 ppm |
| | | | Solvaperm Red Violet R | 0.6 ppm |
| Comparative Example 12 | 1.5 | Dye | Plast Blue 8520 | 1.8 ppm |
| | | | Solvaperm Red Violet R | 0.6 ppm |
| Comparative Example 13 | 1.5 | Dye | Plast Blue 8520 | 1.8 ppm |
| | | | Solvaperm Red Violet R | 0.6 ppm |

TABLE 2

| | Resin Yellowness (YI) | Light cutting rate at wavelength of 420 nm [%] | Haze value [%] | Total light transparency [%] |
|---|---|---|---|---|
| Example 1 | 5.6 | 81.0 | 0.29 | 83.5 |
| Example 2 | 5.6 | 80.6 | — | — |
| Example 3 | 5.9 | 78.2 | 0.12 | 84.5 |
| Example 4 | 6.5 | 76.7 | 0.10 | 83.5 |
| Example 5 | 8.7 | 80.9 | 0.22 | 84.4 |
| Example 6 | 3.4 | 71.0 | 0.16 | 83.5 |
| Example 7 | 4.9 | 83.4 | — | — |
| Comparative Example 1 | 11.5 | 79.9 | 0.18 | 93.3 |
| Comparative Example 2 | 13.1 | 80.1 | — | — |
| Comparative Example 3 | 12.4 | 81.6 | — | — |
| Comparative Example 4 | 14.9 | 81.4 | 0.21 | 93.0 |
| Comparative Example 5 | 12.9 | 76.4 | 0.23 | 93.3 |
| Comparative Example 6 | 14.9 | 76.0 | 0.32 | 91.8 |
| Comparative Example 7 | 16.9 | 80.3 | 0.16 | 91.8 |
| Comparative Example 8 | 8.1 | 78.3 | 3.70 | 83.8 |
| Comparative Example 9 | 6.4 | 81.8 | 3.56 | 84.8 |
| Comparative Example 10 | 2.4 | 18.2 | 0.10 | 90.1 |
| Comparative Example 11 | 2.0 | 16.6 | 0.16 | 89.7 |
| Comparative Example 12 | 0.9 | 10.3 | 0.17 | 89.8 |
| Comparative Example 13 | 3.5 | 15.2 | 0.23 | 89.8 |

This application claims priority based on Japanese Patent Application No. 2015-232019 filed on Nov. 27, 2015, the entire disclosure of which is incorporated herein.

The invention claimed is:

1. A polymerizable composition for an optical material comprising:
    a compound (A) represented by General Formula (1) and including two or more allyloxycarbonyl groups;
    an ultraviolet absorbing agent (B) represented by General Formula (i);
    at least one kind of radical polymerization initiator (C) selected from the group consisting of a peroxyketal-based radical polymerization initiator, a peroxymonocarbonate-based radical polymerization initiator, and a peroxyester-based radical polymerization initiator; and
    at least one kind of dye (D) selected from an anthraquinone-based dye, a perinone-based dye, a monoazo-based dye, and a diazo-based dye,

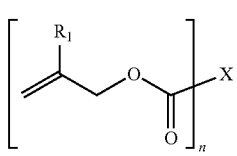
(1)

wherein, in the formula, n is an integer of 2 to 6, $R_1$ indicates a hydrogen atom or a methyl group, a plurality of present $R_1$'s may be the same or different, X is a divalent to hexavalent organic group a derived from a linear or branched aliphatic polyol having 3 to 12 carbon atoms which may have an oxygen atom, a divalent to hexavalent organic group b derived from an alicyclic polyol having 5 to 16 carbon atoms which may have an oxygen atom, or a divalent to hexavalent organic group c derived from an aromatic compound having 6 to 12 carbon atoms, and the organic group a or the organic group b forms an allyl carbonate group by bonding to an allyloxycarbonyl group via an oxygen atom derived from a hydroxyl group provided in these groups,

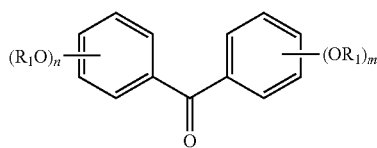
(i)

wherein, in the formula, $R_1$ indicates a hydrogen atom, a linear or branched alkyl group having 1 to 20 carbon atoms, a plurality of present $R_1$'s may be the same or different, m indicates an integer of 1 to 3, n indicates an integer of 1 to 3, and a sum of m and n is an integer of 3 to 6.

2. The polymerizable composition for an optical material according to claim 1,
wherein the compound (A) including two or more allyloxycarbonyl groups includes
an allyl carbonate polymerizable compound (A1) represented by General Formula (2) and an oligomer thereof,
an allyl ester polymerizable compound (A2) represented by General Formula (3) or (4) and an oligomer thereof, or
a polymerizable compound (A3) represented by General Formula (5) and including at least one of an allyl ester group and an allyl carbonate group and an oligomer thereof,

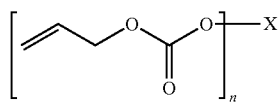
(2)

wherein, in formula (Z), X represents a divalent to hexavalent group derived from a linear or branched aliphatic polyol having 3 to 12 carbon atoms or a divalent to hexavalent group derived from an alicyclic polyol having 5 to 16 carbon atoms, and n represents an integer of 2 to 6,

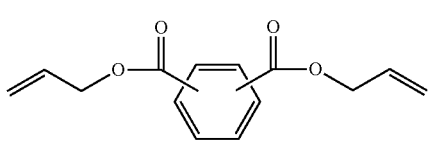
(3)

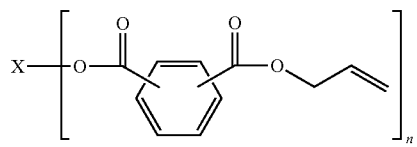
(4)

wherein, in Formula (4), X represents a divalent group derived from a linear or branched aliphatic diol having 2 to 8 carbon atoms, a trivalent to hexavalent group derived from a linear or branched aliphatic polyol having 3 to 10 carbon atoms and having 3 to 6 hydroxyl groups, and n represents an integer of 2 to 6,

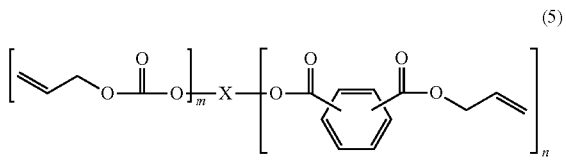
(5)

wherein, in Formula (5), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, m and n represent integers of 0 to 6, and a sum of m and n is an integer of 2 to 6.

3. The polymerizable composition for an optical material according to claim 2,
wherein the allyl carbonate polymerizable compound (A1) includes at least one kind selected from
a bis(allyl carbonate) compound of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$] tricyclodecane,
a tris(allyl carbonate) compound of at least one kind of triol selected from glycerol, trimethylolpropane, and tris(hydroxyethyl) isocyanurate,
a tetra(allyl carbonate) compound of at least one kind of tetraol selected from pentaerythritol, diglycerol, and ditrimethylol propane,
a dipentaerythritol hexa(allyl carbonate) compound, and
a mixed poly(allyl carbonate) compound of at least two kinds of compounds selected from the diols, the triols, the tetraols, and the dipentaerythritol.

4. The polymerizable composition for an optical material according to claim 2,
wherein the allyl carbonate polymerizable compound (A1) includes at least one kind selected from
(i) a mixture of a diethylene glycol bis(allyl carbonate) compound and an oligomer thereof, (ii) a mixture of a bis(allyl carbonate) compound of a mixture of diethylene glycol and neopentyl glycol and an oligomer thereof, (iii) a mixture of a poly(allyl carbonate) compound of a mixture of diethylene glycol and tris(hydroxyethyl) isocyanurate and an oligomer thereof, (iv) a mixture of a poly(allyl carbonate) compound of a mixture of diethylene glycol and trimethylolpropane and an oligomer thereof, (v) a mixture of a poly(allyl carbonate) compound of a mixture of diethylene glycol and pentaerythritol and an oligomer thereof, (vi) a mixture of a poly(allyl carbonate) compound of a mixture of diethylene glycol, neopentyl glycol and pentaerythritol and an oligomer thereof, and (vii) a poly(allyl carbonate) mixture comprising a mixture of a poly(allyl carbonate) compound of a mixture of diethylene glycol, neopentyl glycol, and pentaerythritol and an oligomer thereof, and a mixture of a diethylene glycol bis(allyl carbonate) compound and an oligomer thereof.

5. The polymerizable composition for an optical material according to claim 2, wherein the allyl ester polymerizable compound (A2) or the polymerizable compound (A3) includes at least one kind selected from a diallyl phthalate compound selected from diallyl isophthalate, diallyl terephthalate and diallyl orthophthalate, a diallyl ester compound obtained by an ester replacement reaction of the diallyl phthalate compound and a mixture of at least one kind of diol selected from ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, and 1,4-dimethylolcyclohexane, and an oligomer thereof, a polyallyl ester compound obtained by an ester replacement reaction of the diallyl phthalate compound and a mixture of at least one kind of polyol selected from glycerol, trimethylolpropane, tris(hydroxyethyl) isocyanurate, pentaerythritol, diglycerol, ditrimethylolpropane, and dipentaerythritol, and an oligomer thereof, and an allyl ester compound, an allyl carbonate compound, and a compound having an allyl carbonate group and an allyl ester group, obtained by an ester replacement reaction of a mixture of at least one kind of dialkyl phthalate selected from dialkyl isophthalate having an alkyl group having 1 to 3 carbon atoms, dialkyl terephthalate, and dialkyl orthophthalate, allyl alcohol, diallyl carbonate, and the diols or the polyols, and oligomers thereof.

6. The polymerizable composition for an optical material according to claim 2, wherein the allyl ester polymerizable compound (A2) or the polymerizable compound (A3) includes at least one kind selected from (i) a mixture of diallyl terephthalate and a diethylene glycol bis(allyl carbonate) compound at 30% by weight with respect to the diallyl terephthalate and an oligomer thereof, (ii) an allyl ester compound obtained by an ester replacement reaction of a mixture of diallyl terephthalate and propylene glycol, (iii) a mixture of the allyl ester compound of (ii) and a diethylene glycol bis(allyl carbonate) compound at 20% by weight with respect to the allyl ester compound and an oligomer thereof, (iv) a mixture of an allyl ester compound, an allyl carbonate compound, and a compound having an allyl ester group and an allyl carbonate group, obtained by an ester replacement reaction of a mixture of dimethyl terephthalate, allyl alcohol, diallyl carbonate, and diethylene glycol, and (v) a mixture of the mixture obtained in (iv) and a diethylene glycol bis(allyl carbonate) compound at 10% by weight with respect to the mixture and an oligomer thereof.

7. The polymerizable composition for an optical material according to claim 2, wherein the compound (A) including two or more allyloxycarbonyl groups is a mixture of the allyl ester polymerizable compound (A2) and/or the polymerizable compound (A3) and oligomers thereof, and the allyl carbonate polymerizable compound (A1) and an oligomer thereof, wherein the allyl ester polymerizable compound (A2) and/or the polymerizable compound (A3) includes at least one kind selected from a diallyl phthalate compound selected from diallyl isophthalate, diallyl terephthalate and diallyl orthophthalate, a diallyl ester compound obtained by an ester replacement reaction of the diallyl phthalate compound and a mixture of at least one kind of diol selected from ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, and 1,4-dimethylolcyclohexane, and an oligomer thereof, a polyallyl ester compound obtained by an ester replacement reaction of the diallyl phthalate compound and a mixture of at least one kind of polyol selected from glycerol, trimethylolpropane, tris(hydroxyethyl) isocyanurate, pentaerythritol, diglycerol, ditrimethylolpropane, and dipentaerythritol, and an oligomer thereof, and an allyl ester compound, an allyl carbonate compound, and a compound having an allyl carbonate group and an allyl ester group, obtained by an ester replacement reaction of a mixture of at least one kind of dialkyl phthalate selected from dialkyl isophthalate having an alkyl group having 1 to 3 carbon atoms, dialkyl terephthalate, and dialkyl orthophthalate, allyl alcohol, diallyl carbonate, and the diols or the polyols, and oligomers thereof, and wherein the allyl carbonate polymerizable compound (A1) includes at least one kind selected from a bis(allyl carbonate) compound of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.02,6] tricyclodecane,
a tris(allyl carbonate) compound of at least one kind of triol selected from glycerol, trimethylolpropane, and tris(hydroxyethyl) isocyanurate,
a tetra(allyl carbonate) compound of at least one kind of tetraol selected from pentaerythritol, diglycerol, and ditrimethylol propane,
a dipentaerythritol hexa(allyl carbonate) compound, and
a mixed poly(allyl carbonate) compound of at least two kinds of compounds selected from the diols, the triols, the tetraols, and the dipentaerythritol.

8. The polymerizable composition for an optical material according to claim 1,
wherein the ultraviolet absorbing agent (B) is 2,2'-dihydroxy-4-methoxybenzophenone, 2,2',4,4'-tetrahydroxybenzophenone, or 2,2'-dihydroxy-4,4'-dimethoxybenzophenone.

9. The polymerizable composition for an optical material according to claim 1,
wherein the radical polymerization initiator (C) is at least one kind selected from the group consisting of a peroxyketal-based polymerization initiator represented by General Formula (6) having a 10-hour half-life temperature of 80° C. or higher, a peroxymonocarbonate-based polymerization initiator represented by General Formula (7) having a 10-hour half-life temperature of 80° C. or higher, and a peroxyester-based polymerization initiator represented by General Formula (8) having a 10-hour half-life temperature of 65° C. or higher,

wherein, in Formula (6), $R_3$ is a tertiary alkyl group, $R_1$ and $R_2$ are each independently an alkyl group selected from methyl, ethyl, propyl, and butyl, and the alkyl group may have an alkyl ester group at a terminal of a chain or $R_1$ and $R_2$ may form a cycloalkylene group together with carbon atoms bonded thereto together, and the cycloalkylene group may have 1 to 3 alkyl substituents,

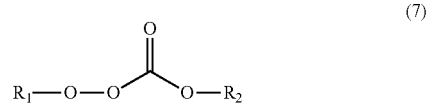

wherein, in Formula (7), $R_1$ is a tertiary alkyl group having 3 to 6 carbon atoms, and $R_2$ is a linear or branched alkyl group having 3 to 8 carbon atoms,

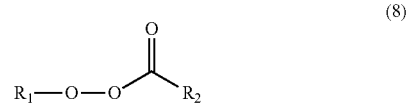

wherein, in Formula (8), $R_1$ is a tertiary alkyl group having 3 to 6 carbon atoms, and $R_2$ is a linear or branched alkyl group having 3 to 9 carbon atoms or a phenyl group.

10. A molded article obtained by curing the polymerizable composition for an optical material according to claim 1.

11. An optical material comprising the molded article according to claim 10.

12. A plastic lens comprising the molded article according to claim 10.

13. A method for manufacturing a plastic lens comprising:
a step of preparing a polymerizable composition for an optical material by batch mixing
a compound (A) represented by General Formula (1) including two or more allyloxycarbonyl groups,
an ultraviolet absorbing agent (B) represented by General Formula (i),
at least one kind of radical polymerization initiator (C) selected from the group consisting of a peroxyketal-based radical polymerization initiator, a peroxymonocarbonate-based radical polymerization initiator, and a peroxyester-based radical polymerization initiator, and
at least one kind of dye (D) selected from an anthraquinone-based dye, a perinone-based dye, a monoazo-based dye, and a diazo-based dye; and
a step of forming a lens base material by casting and polymerizing the polymerizable composition for an optical material,

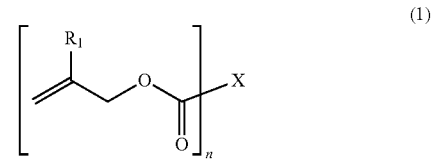

wherein, in the formula, n is an integer of 2 to 6, $R_1$ indicates a hydrogen atom or a methyl group, a plurality of present $R_1$'s may be the same or different, X is a divalent to hexavalent organic group a derived from a linear or branched aliphatic polyol having 3 to 12 carbon atoms which may have an oxygen atom, a divalent to hexavalent organic group b derived from an alicyclic polyol having 5 to 16 carbon atoms which may have an oxygen atom, or a divalent to hexavalent organic group c derived from an aromatic compound having 6 to 12 carbon atoms, and the organic group a or the organic group b forms an allyl carbonate group by bonding to an allyloxycarbonyl group via an oxygen atom derived from a hydroxyl group provided in these groups,

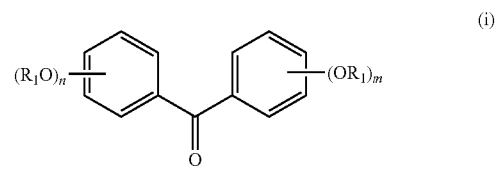

wherein, in the formula, $R_1$ indicates a hydrogen atom, or a linear or branched alkyl group having 1 to 20 carbon atoms, a plurality of present $R_1$'s may be the same or different, m indicates an integer of 1 to 3, n indicates an integer of 1 to 3, and a sum of m and n is an integer of 3 to 6.

* * * * *